United States Patent
Kang et al.

(10) Patent No.: US 12,182,419 B2
(45) Date of Patent: Dec. 31, 2024

(54) STORAGE CONTROLLER RECEIVING READ DATA AND DISTRIBUTION INFORMATION, METHOD OF OPERATING THE SAME, AND METHOD OF OPERATING STORAGE DEVICE INCLUDING THE SAME

(71) Applicant: Samsung Electronics Co., Ltd., Suwon-si (KR)

(72) Inventors: Woohyun Kang, Suwon-si (KR); Su Chang Jeon, Suwon-si (KR); Suhyun Kim, Suwon-si (KR); Hyuna Kim, Suwon-si (KR); Youngdeok Seo, Suwon-si (KR); Hyunkyo Oh, Suwon-si (KR); Donghoo Lim, Suwon-si (KR); Byungkwan Chun, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 26 days.

(21) Appl. No.: 18/184,319

(22) Filed: Mar. 15, 2023

(65) Prior Publication Data
US 2024/0012569 A1    Jan. 11, 2024

(30) Foreign Application Priority Data
Jul. 20, 2022   (KR) .......................... 10-2022-0089310

(51) Int. Cl.
*G06F 11/00*   (2006.01)
*G06F 3/06*    (2006.01)

(52) U.S. Cl.
CPC .......... *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | |
|---|---|---|
| 9,685,206 B2 | 6/2017 | Choi et al. |
| 10,199,111 B1 | 2/2019 | Besinga et al. |
| 10,580,486 B2 | 3/2020 | Kim et al. |
| 11,114,174 B2 | 9/2021 | Oh et al. |
| 11,475,972 B2 | 10/2022 | Yang et al. |
| 2011/0066899 A1* | 3/2011 | Kang ................. G06F 12/0246 711/E12.001 |
| 2013/0080858 A1* | 3/2013 | Lee ..................... G11C 11/5642 714/E11.054 |

(Continued)

FOREIGN PATENT DOCUMENTS

| | | |
|---|---|---|
| KR | 10-2016-0004073 | 1/2016 |
| KR | 10-2347184 | 1/2022 |

(Continued)

*Primary Examiner* — Mujtaba M Chaudry
(74) *Attorney, Agent, or Firm* — Fish & Richardson P.C.

(57) ABSTRACT

Disclosed is a method of operating a storage controller which communicates with a non-volatile memory device. The method includes providing a read command to the non-volatile memory device, receiving first read data and first distribution information corresponding to the read command from the non-volatile memory device, determining whether an error of the first read data is uncorrectable, and updating offset information of a history table in the storage controller based on the first distribution information, in response to determining that the error of the first read data is correctable.

20 Claims, 17 Drawing Sheets

(56) References Cited

U.S. PATENT DOCUMENTS

| | | | | |
|---|---|---|---|---|
| 2013/0297986 | A1* | 11/2013 | Cohen | G06F 3/061 |
| | | | | 714/763 |
| 2013/0343131 | A1* | 12/2013 | Wu | G11C 16/3418 |
| | | | | 365/185.24 |
| 2016/0005480 | A1 | 1/2016 | Kim et al. | |
| 2018/0342305 | A1* | 11/2018 | Cha | G11C 13/0033 |
| 2019/0198097 | A1* | 6/2019 | Kim | G11C 16/34 |
| 2019/0348133 | A1* | 11/2019 | Chen | G11C 11/5642 |
| 2019/0354314 | A1* | 11/2019 | Hung | G06F 3/0679 |
| 2021/0043261 | A1 | 2/2021 | Yu et al. | |
| 2021/0166774 | A1* | 6/2021 | Cha | G11C 16/0483 |
| 2022/0005539 | A1 | 1/2022 | Kim et al. | |
| 2022/0139475 | A1 | 5/2022 | Seo et al. | |
| 2022/0155971 | A1 | 5/2022 | Oh et al. | |
| 2022/0157381 | A1 | 5/2022 | Kim et al. | |
| 2022/0172785 | A1 | 6/2022 | Yoo et al. | |
| 2022/0222138 | A1 | 7/2022 | Park et al. | |
| 2022/0277801 | A1 | 9/2022 | Park et al. | |

FOREIGN PATENT DOCUMENTS

| | | |
|---|---|---|
| KR | 10-2022-0012435 | 2/2022 |
| KR | 10-2392056 | 4/2022 |
| KR | 10-2022-0058278 | 5/2022 |
| KR | 10-2022-0065296 | 5/2022 |
| KR | 10-2022-0067419 | 5/2022 |
| KR | 10-2022-0077312 | 6/2022 |
| KR | 10-2022-0080790 | 6/2022 |

\* cited by examiner

STORAGE CONTROLLER RECEIVING READ DATA AND DISTRIBUTION INFORMATION, METHOD OF OPERATING THE SAME, AND METHOD OF OPERATING STORAGE DEVICE INCLUDING THE SAME

CROSS-REFERENCE TO RELATED APPLICATIONS

This application claims priority under 35 U.S.C. § 119 to Korean Patent Application No. 10-2022-0089310 filed on Jul. 20, 2022, in the Korean Intellectual Property Office, the disclosures of which are incorporated by reference herein in their entireties.

BACKGROUND

A memory device stores data in response to a write request and outputs data stored therein in response to a read request. For example, memory devices can be classified either as volatile memory devices, which lose data stored when power supply is interrupted (e.g., dynamic random access memory (DRAM) devices and static RAM (SRAM) devices) or as non-volatile memory devices, which retain stored data even when power supply is interrupted (e.g., flash memory devices, phase-change RAM (PRAM) devices, magnetic RAM (MRAM) devices, or resistive RAM (RRAM) devices).

Memory cells of non-volatile memory devices may have a programmed threshold voltage distribution corresponding to a bit value of data. A threshold voltage distribution may change due to various factors such as retention time, read disturb, and hot-carrier injection (HCI). The change in the threshold voltage distribution may reduce the reliability of the non-volatile memory device. To check whether there is a reduction in reliability, a storage controller may read distribution information of the non-volatile memory device.

SUMMARY

The subject matter of the present disclosure relates to storage devices and controllers, and more particularly, to storage controllers receiving read data and threshold voltage distribution information, as well as methods of operating the same. Separately managing the input/output (I/O) for read data and the I/O for threshold voltage distribution information can increase the I/O load, e.g., the number of times an I/O operation occurs, of a storage device. Implementations of the subject matter of the present disclosure can reduce the internal I/O load by receiving both the threshold voltage distribution information and the read data together in a read operation. Reducing the internal I/O load can, in some cases, reduce latency effects, e.g., I/O can be performed at 20 nanoseconds compared to 4-16 microseconds in conventional methods.

In general, innovative aspects of the subject matter described in this specification can be embodied in methods of operating a storage controller that communicates with a non-volatile memory device, the methods including: providing a read command to the non-volatile memory device, continuously receiving first read data and first distribution information corresponding to the read command from the non-volatile memory device, determining whether an error of the first read data is uncorrectable, and updating offset information of a history table in the storage controller based on the first distribution information, in response to determining that the error of the first read data is not uncorrectable.

In general, in another aspect, subject matter of the present disclosure can be embodied in methods of operating a storage device that includes a non-volatile memory device and a storage controller, the methods including: providing a read command to the non-volatile memory device, by the storage controller, performing an on-chip read operation based on the read command, by the non-volatile memory device, continuously providing the storage controller with read data and distribution information corresponding to the on-chip read operation, by the non-volatile memory device, determining whether an error of the read data is uncorrectable, by the storage controller, and updating offset information of a history table in the storage controller based on the distribution information, in response to determining that the error of the read data is not uncorrectable, by the storage controller.

In general, other aspects of the present disclosure can be embodied in a storage controller that includes: a command manager that provides a read command to a non-volatile memory device, a buffer memory that continuously receives first read data and first distribution information corresponding to the read command from the non-volatile memory device, an error correcting code (ECC) engine that communicates with the buffer memory and to decode the first read data, under control of the command manager, and a history table that manages offset information. The command manager determines whether an error of the first read data is uncorrectable, based on a communication with the ECC engine, and updates the offset information of the history table based on the first distribution information of the buffer memory, in response to determining that the error of the first read data is not uncorrectable.

BRIEF DESCRIPTION OF THE FIGURES

The above and other objects and features of the present disclosure will become apparent by describing in detail examples thereof with reference to the accompanying drawings.

DETAILED DESCRIPTION

Figure 1:
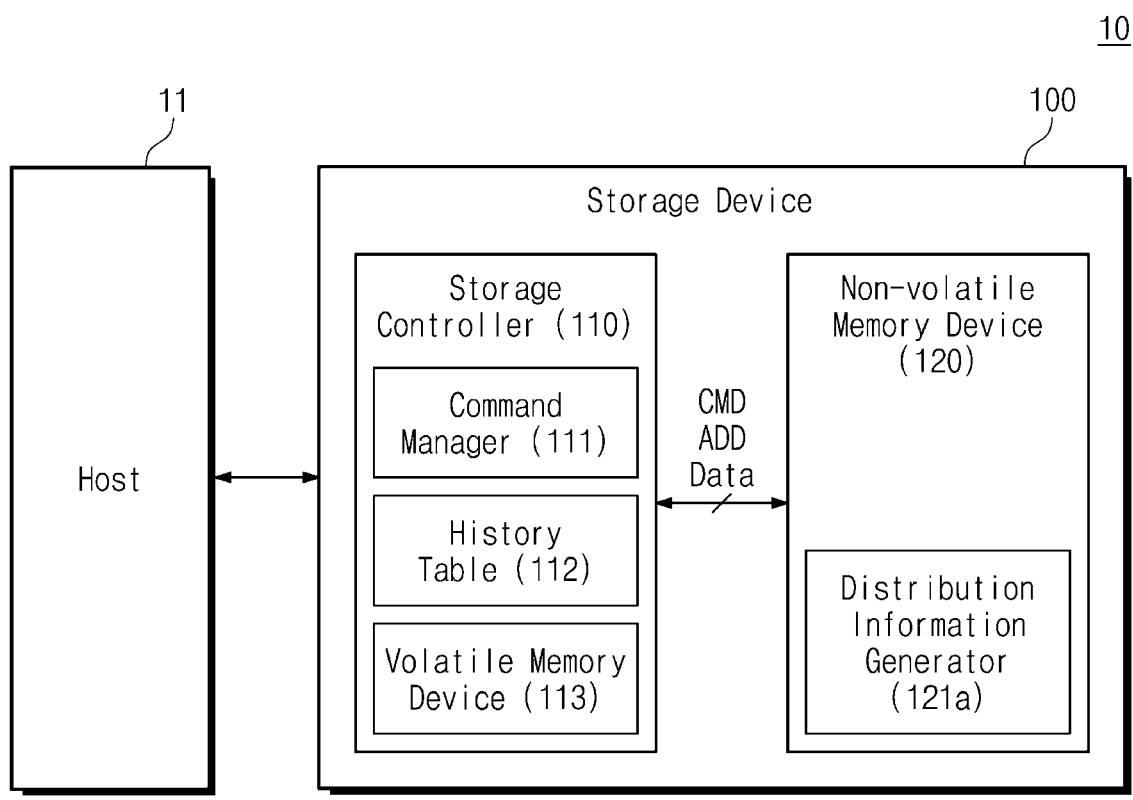
FIG. 1 is a block diagram of an example of a storage system.

FIG. 1 is a block diagram of an example of a storage system. Referring to FIG. 1, a storage system 10 includes a host 11 and a storage device 100. In some implementations, the storage system 10 is a computing system, which is configured to process a variety of information, such as a personal computer (PC), a notebook, a laptop, a server, a workstation, a tablet PC, a smartphone, a digital camera, and a black box.

The host 11 may control an overall operation of the storage system 10. For example, the host 11 may store data in the storage device 100 or may read data stored in the storage device 100.

The storage device 100 may include a storage controller 110 and a non-volatile memory device 120. The non-volatile memory device 120 may store data. The storage controller 110 may store data in the non-volatile memory device 120 or may read data stored in the non-volatile memory device 120. The non-volatile memory device 120 may operate under control of the storage controller 110. For example, based on a command CMD indicating an operation and an address ADD indicating a location of data, the storage controller 110 may store the data in the non-volatile memory device 120 or may read the data stored in the non-volatile memory device 120.

In some implementations, the non-volatile memory device 120 is a NAND flash memory device, but the present disclosure is not limited thereto. For example, the non-volatile memory device 120 may be one of various storage devices, which retain stored data even though power is turned off, such as a phase-change random access memory (PRAM), a magnetic random access memory (MRAM), a resistive random access memory (RRAM), and a ferroelectric random access memory (FRAM).

The storage controller 110 may include a command manager 111, a history table 112, and a volatile memory device 113.

The command manager 111 may manage various commands indicating operations to be performed in the non-volatile memory device 120. For example, the command manager 111 may provide the non-volatile memory device 120 with various commands such as a read command, a write command, and an erase command.

The command manager 111 may manage commands guaranteeing the reliability of the non-volatile memory device 120. For example, the command manager 111 may manage commands guaranteeing the reliability, such as a read retry command and a read reclaim command, based on distribution information obtained from a distribution information generator 121a of the non-volatile memory device 120.

The distribution information may indicate a degradation level of memory cells of the non-volatile memory device 120. For example, the memory cells of the non-volatile memory device 120 may form a distribution of threshold voltages programmed depending on bit values of data. A threshold voltage distribution may change due to various factors such as retention, read disturb, and hot-carrier injection (HCI). The distribution information may indicate a threshold voltage distribution changed due to various factors. The distribution information may include offset information or on-chip valley search (OVS) count data generated by an on-chip read operation of the non-volatile memory device 120. The on-chip read operation may refer to an operation of internally generating both read data and distribution information in a memory chip corresponding to the non-volatile memory device 120. The offset information will be described in detail with reference to FIG. 6. The OVS count data will be described in detail with reference to FIG. 7.

The read retry operation may refer to an operation of changing a read voltage level and again performing the read operation. For example, the storage controller 110 may provide the non-volatile memory device 120 with a read command indicating a target read voltage level. An error of read data obtained based on the target read voltage level may be uncorrectable. The storage controller 110 may optimize the target read voltage level based on the distribution information (e.g., increase or decrease the target read voltage level based on the degradation level) and may provide the non-volatile memory device 120 with the read retry command indicating the optimized target read voltage level (e.g., the increased/decreased target read voltage level).

The read reclaim operation may refer to an operation of again writing data stored in the memory cells of the non-volatile memory device 120 in any other memory cells to guarantee the reliability of data. For example, a threshold voltage distribution of the memory cells of the non-volatile memory device 120 may change over time. Before data are incapable of being restored due to the degradation, the storage controller 110 may determine that the read reclaim operation is required. The storage controller 110 may read data stored in the memory cells of the non-volatile memory device 120, may copy the read data to any other memory cells, and may then erase the data of the memory cells degraded.

The history table 112 may manage the offset information of the memory cells of the non-volatile memory device 120. The command manager 111 may update the offset information of the history table 112 based on the distribution information generated by the distribution information generator 121a of the non-volatile memory device 120. The offset information may indicate a difference between a voltage level of an optimized valley at a time when the read command for obtaining the distribution information is processed and a voltage level of a default valley at an initial time (i.e., at a time when a bit value is programmed). The offset information may be used to determine the target read voltage level in a next read operation by the command manager 111.

The volatile memory device 113 may be used as a main memory, a buffer memory, or a cache memory of the storage controller 110. At least a portion of the volatile memory device 113 may be used as a buffer memory that stores the read data and the distribution information received from the non-volatile memory device 120. The volatile memory device 113 may be implemented with a static random access memory (SRAM) or a dynamic random access memory or DRAM).

The non-volatile memory device 120 may include the distribution information generator 121a. The distribution information generator 121a may generate the distribution information corresponding to the read data based on the read command of the command manager 111. For example, the non-volatile memory device 120 may generate the read data based on the read command. The distribution information generator 121a may generate the distribution information as the byproduct of the read data. The distribution information generator 121a may provide the distribution information to the storage controller 110.

In some implementations, the distribution information generator 121a provides the storage controller 110 with the distribution information together with the read data. For example, the storage controller 110 may provide the read command to the non-volatile memory device 120. The non-volatile memory device 120 may process the read command and may provide the storage controller 110 with the read data and the distribution information.

After issuing the read command, the storage controller 110 may obtain the distribution information from the non-volatile memory device 120 without issuing an additional command for obtaining the distribution information, and thus, the input/output load between the storage controller 110 and the non-volatile memory device 120 may decrease.

Figure 2:
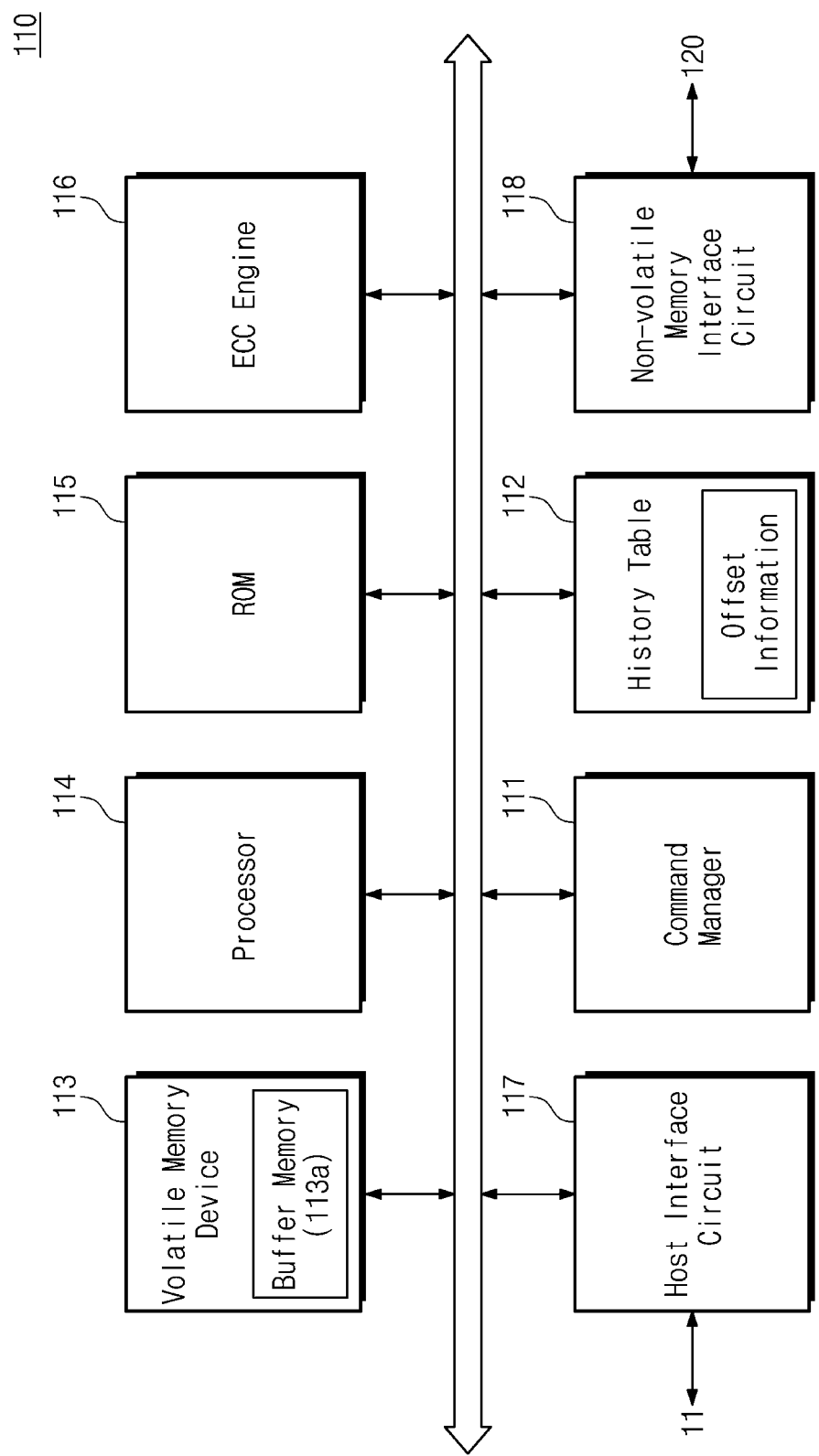
FIG. 2 is a block diagram illustrating the storage controller of FIG. 1 in detail.

FIG. 2 is a block diagram illustrating the storage controller of FIG. 1 in detail. Referring to FIGS. 1 and 2, the storage controller 110 may communicate with the host 11 and the non-volatile memory device 120.

The storage controller 110 may include the command manager 111, the history table 112, the volatile memory device 113, a processor 114, a read only memory (ROM) 115, an error correcting code (ECC) engine 116, a host interface circuit 117, and a non-volatile memory interface circuit 118. The command manager 111, the history table 112, and the volatile memory device 113 may respectively correspond to the command manager 111, the history table 112, and the volatile memory device 113 of FIG. 1.

The command manager 111 may manage commands indicating operations to be performed in the non-volatile memory device 120. The history table 112 may manage the offset information.

In some implementations, the command manager 111 and the history table 112 are implemented in the form of a firmware module. For example, the processor 114 may implement the command manager 111 and the history table 112 by loading instructions stored in the non-volatile memory device 120 to the volatile memory device 113 and executing the loaded instructions. However, the present disclosure is not limited thereto. For example, the command manager 111 and the history table 112 may be implemented with separate hardware or may be implemented with a combination of hardware and software.

The volatile memory device 113 may be used as a main memory, a buffer memory, or a cache memory of the storage controller 110. The volatile memory device 113 may include a buffer memory 113a. The buffer memory 113a may temporarily store read data and distribution information read from the non-volatile memory device 120. The read data and the distribution information stored in the buffer memory 113a may be provided to the command manager 111 and the history table 112.

The processor 114 may control an overall operation of the storage controller 110. The memory ROM 115 may be used as a read only memory that stores information necessary for the operation of the storage controller 110.

The ECC engine 116 may detect and correct an error of data obtained from the non-volatile memory device 120. For example, the ECC engine 116 may have an error correction capability of a given level. The ECC engine 116 may process data having an error level (e.g., the number of flipped bits) that exceeds the error correction capability of the ECC engine 116. This data error may be referred to as an "uncorrectable" error.

In some implementations, the command manager 111 determines whether the error of the read data is uncorrectable, based on the communication with the ECC engine 116. The command manager 111 may determine whether to perform the read retry operation, depending on whether the error of the read data is uncorrectable.

In some implementations, the ECC engine 116 manages an encoding operation and a randomize operation. The encoding operation may refer to an operation of generating a parity code for error correction. The randomize operation may refer to an operation of managing threshold voltage states of the memory cells so as to be distributed to various threshold voltage distributions without being concentrated in a specific threshold voltage state.

The ECC engine 116 may include an encoding circuit and a decoding circuit. The encoding circuit may perform the encoding operation and the randomize operation on the write data received from the host 11. The decoding circuit may perform a decoding operation and a de-randomize operation on the read data received from the non-volatile memory device 120. The decoding operation and the de-randomize operation may respectively correspond to the encoding operation and the randomize operation.

In some implementations, the decoding circuit performs the decoding operation and the de-randomize operation only on the read data among the read data and the distribution information. For example, the decoding circuit may not perform the decoding operation and the de-randomize operation on the distribution information received from the non-volatile memory device 120.

The storage controller 110 may communicate with the host 11 through the host interface circuit 117. In some implementations, the host interface circuit 117 is implemented based on at least one of various interfaces such as a serial ATA (SATA) interface, a peripheral component interconnect express (PCIe) interface, a serial attached SCSI (SAS), a nonvolatile memory express (NVMe) interface, and an universal flash storage (UFS) interface.

The storage controller 110 may communicate with the non-volatile memory device 120 through the non-volatile memory interface circuit 118. In some implementations, the non-volatile memory interface circuit 118 is implemented based on a NAND interface.

Figure 3:
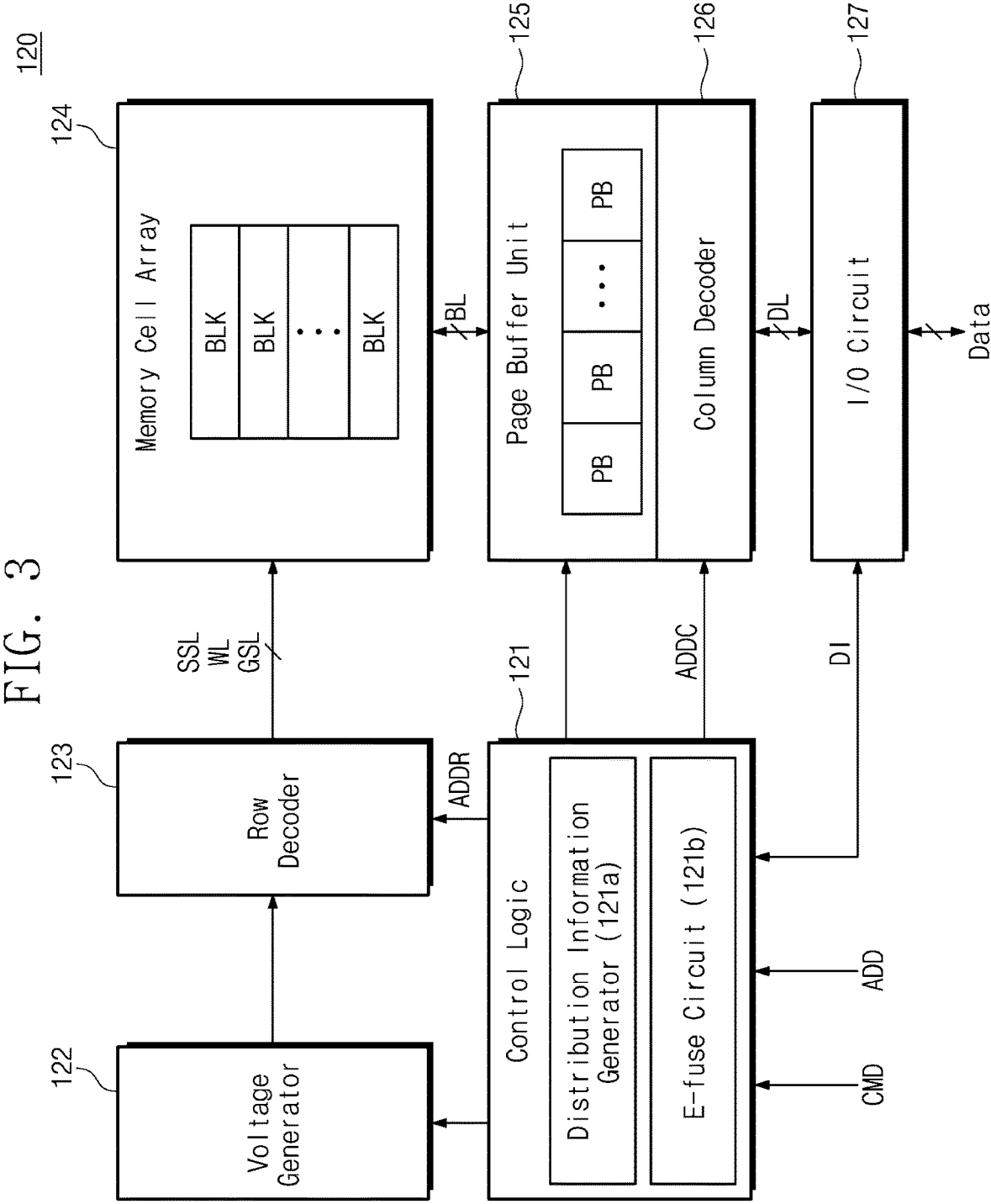
FIG. 3 is a block diagram illustrating the non-volatile memory device of FIG. 1 in detail.

FIG. 3 is a block diagram illustrating the non-volatile memory device of FIG. 1 in detail. Referring to FIGS. 1 and 3, the non-volatile memory device 120 may communicate with the storage controller 110. For example, the non-volatile memory device 120 may receive the address ADD and the command CMD from the storage controller 110. The non-volatile memory device 120 may exchange data with the storage controller 110.

The non-volatile memory device 120 may include control logic 121, a voltage generator 122, a row decoder 123, a memory cell array 124, a page buffer unit 125, a column decoder 126, and an input/output (I/O) circuit 127.

The control logic 121 may receive the command CMD and the address ADD from the storage controller 110. The command CMD may refer to a signal indicating an operation to be performed by the non-volatile memory device 120, such as a read operation, a write operation, or an erase operation. The address ADD may include a row address ADDR and a column address ADDC. The control logic 121 may control an overall operation of the non-volatile memory device 120 based on the command CMD and the address ADD. The control logic 121 may generate the row address ADDR and the column address ADDC based on the address ADD.

The control logic 121 may include the distribution information generator 121a and an E-fuse circuit 121b. The distribution information generator 121a may generate distribution information DI based on the communication with the I/O circuit 127. The E-fuse circuit 121b may be updated based on the distribution information DI.

For example, the distribution information generator 121a may receive the read data from the I/O circuit 127. The distribution information generator 121a may generate the distribution information DI as the byproduct of the read data. The distribution information generator 121a may update the E-fuse circuit 121b based on the distribution information DI. The distribution information DI updated in the E-fuse circuit 121b may be used to perform a next read operation depending on an optimized read voltage level. Through the I/O circuit 127, the distribution information generator 121a may provide the storage controller 110 with the distribution information DI together with the read data.

Under control of the control logic 121, the voltage generator 122 may control voltages to be applied to the memory cell array 124 through the row decoder 123.

The row decoder 123 may receive the row address ADDR from the control logic 121. The row decoder 123 may be connected with the memory cell array 124 through string selection lines SSL, word lines WL, and ground selection lines GSL. The row decoder 123 may decode the row address ADDR and may control voltages to be applied to the string selection lines SSL, the word lines WL, and the ground selection lines GSL based on a decoding result and a voltage(s) received from the voltage generator 122.

The memory cell array 124 may include a plurality of memory blocks BLK. The memory block BLK may correspond to a physical erase unit of the non-volatile memory device 120, but the present disclosure is not limited thereto. For example, the physical erase unit may be changed to a page unit, a word line unit, a sub-block unit, or the like.

The memory block BLK may include a plurality of memory cells. Each of the plurality of memory cells may store 2 or more bits. For example, the memory cell of the memory block BLK may be implemented with a memory cell such as a multi-level cell storing 2 bits, a triple level cell storing 3 bits, a quadruple level cell storing 4 bits.

The page buffer unit 125 may include a plurality of page buffers PB. The page buffer unit 125 may be connected with the memory cell array 124 through bit lines BL. The page buffer unit 125 may read data from the memory cell array 124 in units of page, by sensing voltages of the bit lines BL under control of the control logic 121.

The column decoder 126 may receive the column address ADDC from the control logic 121. The column decoder 126 may decode the column address ADDC and may provide the data read by the page buffer unit 125 to the I/O circuit 127 based on a decoding result.

The column decoder 126 may receive data from the I/O circuit 127 through data lines DL. The column decoder 126 may receive the column address ADDC from the control logic 121. The column decoder 126 may decode the column address ADDC and may provide the data received from the I/O circuit 127 to the page buffer unit 125 based on a decoding result. The page buffer unit 125 may store the data provided from the I/O circuit 127 in the memory cell array 124 through the bit lines BL in units of page.

The I/O circuit 127 may be connected with the column decoder 126 through the data lines DL. The I/O circuit 127 may provide data received from the storage controller 110 to the column decoder 126 through the data lines DL. The I/O circuit 127 may output data received through the data lines DL to the storage controller 110.

Figure 4A:
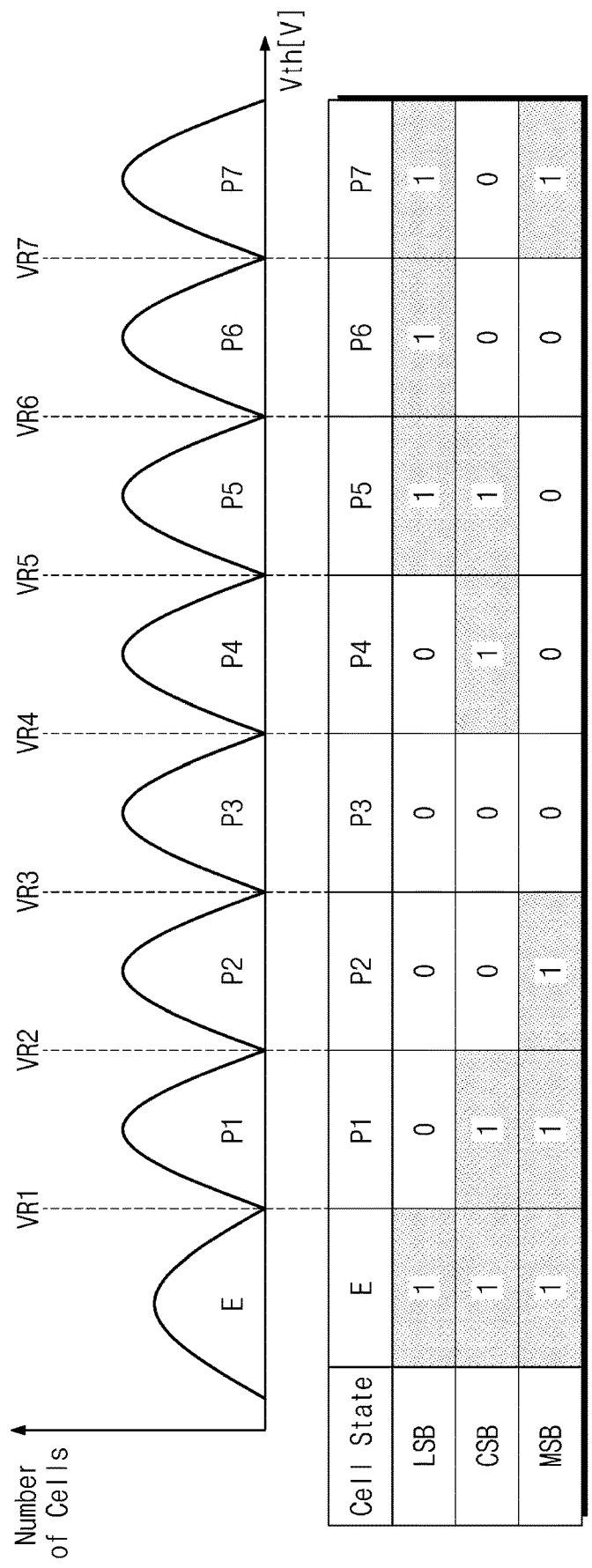
FIG. 4A is a diagram illustrating examples of threshold voltage distributions of triple level cells.
Figure 4B:
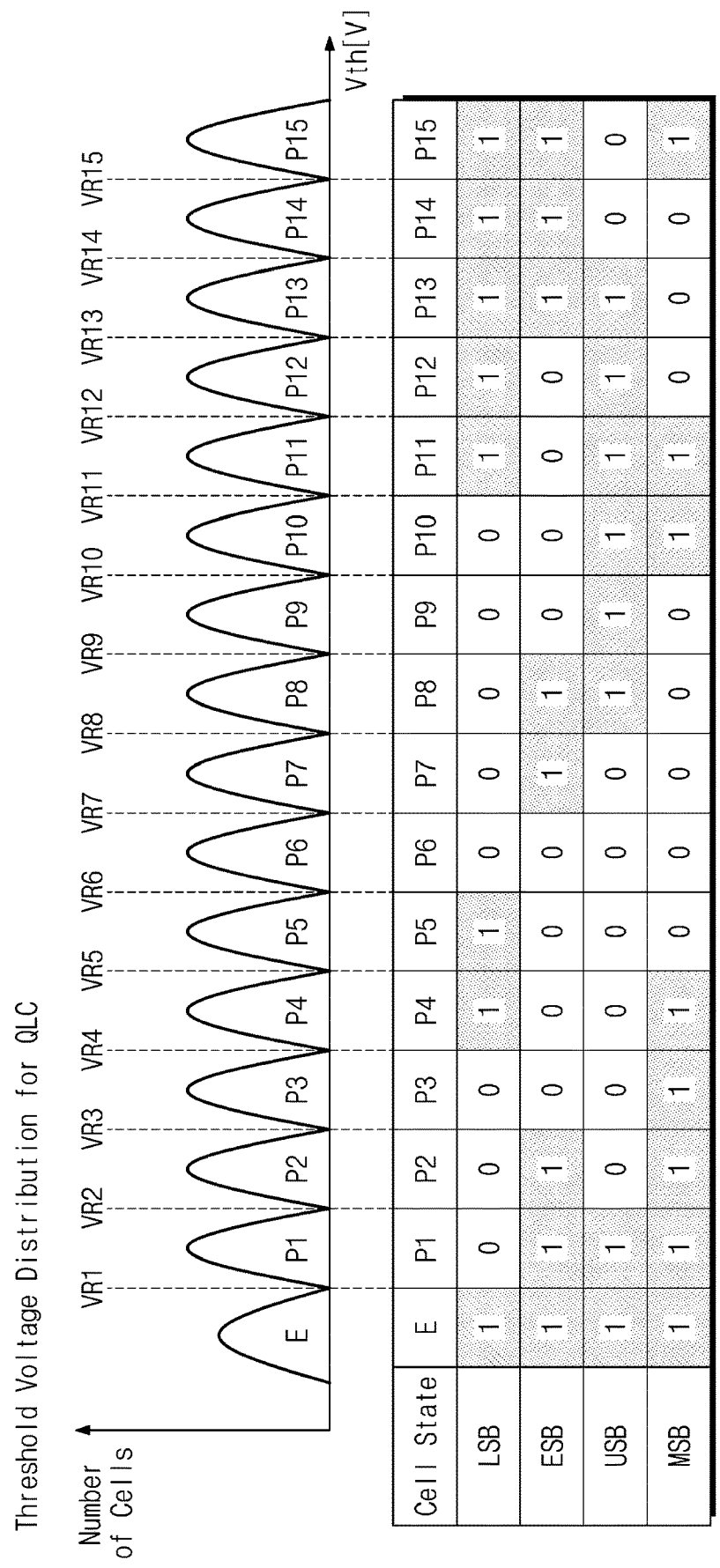
FIG. 4B is a diagram illustrating examples of threshold voltage distributions for quadruple level cells.

FIG. 4A is a diagram illustrating examples of threshold voltage distributions of triple level cells. A graph of threshold voltage distributions of the triple level cells TLC each storing 3 bits and a bit table for each page corresponding to the threshold voltage distributions are illustrated in FIG. 4B.

In the graph of the triple level cell TLC, a horizontal axis represents a threshold voltage (e.g., a level of a threshold voltage), and a vertical axis represents the number of cells. In this example, the triple level cell TLC has an erase state "E" and first to seventh programming states P1, P2, P3, P4, P5, P6, and P7 whose threshold voltage distributions sequentially increase.

In this example of a triple level cell TLC, a first read voltage VR1 indicates a voltage level for distinguishing the erase state "E" from the first programming state P1. Likewise, each of second to seventh read voltage levels VR2 to VR7 indicates a voltage level for distinguishing each of the second to seventh programming states P2 to P7 from a previous state (i.e., an immediately previous state having a low threshold voltage distribution).

Referring to the table of the triple level cell TLC, a least significant bit LSB, a center significant bit CSB, and a most significant bit MSB according to a cell state are illustrated. A physical page corresponding to the triple level cell TLC storing 3 bits corresponds to a first logical page, a second logical page, and a third logical page. In the triple level cell TLC, the first logical page indicates the least significant bit LSB, the second logical page may indicate the center significant bit CSB, and the third logical page may indicate the most significant bit MSB.

In some implementations, each of the first to seventh read voltages VR1 to VR7 of the triple level cell TLC corresponds to one of a plurality of logical pages. For example, in the triple level cell TLC, the read operation corresponding to the first logical page may be performed based on the first read voltage VR1 and the fifth read voltage VR5. The read operation corresponding to the second logical page may be performed based on the second read voltage VR2, the fourth read voltage VR4, and the sixth read voltage VR6. The read operation corresponding to the third logical page may be performed based on the third read voltage VR3 and the seventh read voltage VR7.

FIG. 4B is a diagram illustrating examples of threshold voltage distributions for quadruple level cells. A graph of threshold voltage distributions of the quadruple level cells QLC each storing 4 bits and a bit table for each page corresponding to the threshold voltage distributions are illustrated in FIG. 4B.

In the graph of the quadruple level cell QLC, a horizontal axis represents a threshold voltage (e.g., a level of a threshold voltage), and a vertical axis represents the number of cells. In this example, the quadruple level cell QLC has an erase state "E" and first to fifteenth programming states P1, P2, P3, P4, P5, P6, P7, P8, P9, P10, P11, P12, P13, P14, and P15 in which threshold voltage distributions sequentially increase.

In this example of a quadruple level cell QLC, a first read voltage VR1 indicates a voltage level for distinguishing the erase state "E" from the first programming state P1. Likewise, each of second to fifteenth read voltage levels VR2 to VR15 indicates a voltage level for distinguishing each of the second to fifteenth programming states P2 to P15 from a previous state (i.e., an immediately previous state having a low threshold voltage distribution).

Referring to the table of the quadruple level cell QLC, a least significant bit LSB, a first center significant bit ESB, a second center significant bit USB, and a most significant bit MSB according to a cell state are illustrated. A physical page corresponding to the quadruple level cell QLC storing 4 bits corresponds to a first logical page, a second logical page, a third logical page, and a fourth logical page. In the quadruple level cell QLC, the first logical page may indicate the least significant bit LSB, the second logical page may indicate the first center significant bit ESB, the third logical page may indicate the second center significant bit USB, and the fourth logical page may indicate the most significant bit MSB.

In some implementations, each of the first to fifteenth read voltages VR1 to VR15 of the quadruple level cell QLC may correspond to one of a plurality of logical pages. For example, in the quadruple level cell QLC, the read operation corresponding to the first logical page may be performed based on the first, fourth, sixth, and eleventh read voltages VR1, VR4, VR6, and VR11. The read operation corresponding to the second logical page may be performed based on the third, seventh, ninth, and thirteenth read voltages VR3, VR7, VR9, and VR13. The read operation corresponding to the third logical page may be performed based on the second, eighth, and fourteenth read voltages VR2, VR8, and VR14. The read operation corresponding to the fourth logical page may be performed based on the fifth, tenth, twelfth, and fifteenth read voltages VR5, VR10, VR12, and VR15.

As described above, the states and the read voltage levels of the triple level cell TLC, and the quadruple level cell QLC are described with reference to FIGS. 4A and 4B. However, the present disclosure is not limited thereto. For example, one skilled in the art may understand that read voltages corresponding to each logical page are variously changed or modified and one memory cell is implemented with a multi-level cell (MLC) or may be implemented with a memory cell storing 4 or more bits.

Figure 5:
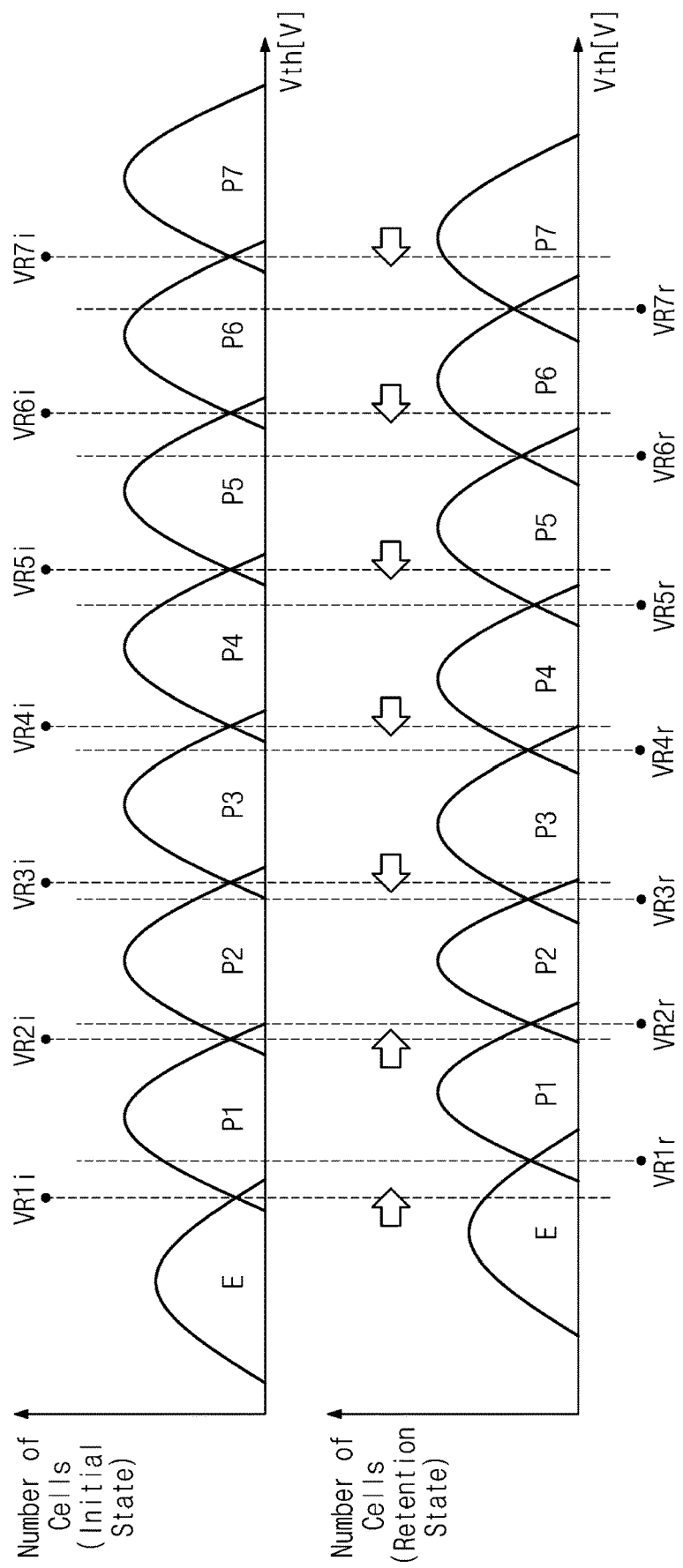
FIG. 5 is a diagram describing an example of change of a threshold voltage distribution.

FIG. 5 is a diagram describing an example of change of a threshold voltage distribution. Threshold voltage distributions of an initial state and threshold voltage distributions of a retention state will be described with reference to FIG. 5. The initial state may refer to a state of a time (i.e., an initial time) when memory cells are programmed to form threshold voltage distributions. The retention state may refer to a state of a time when a given time passes from the initial state or a state of a time when the read command is processed to obtain read data and distribution information.

In the graph of the initial state, a horizontal axis represents a threshold voltage (e.g., a level of a threshold voltage), and a vertical axis represents the number of memory cells. A threshold voltage level of each memory cell may correspond to one of the erase state "E" and the first to seventh programming states P1 to P7. A first initial read voltage level VR1i may be a voltage level of a valley optimized to distinguish memory cells of the erase state "E" from memory cells of the first programming state P1.

The optimized valley may indicate a voltage level at which the number of memory cells having an error bit is minimized (i.e., memory cells each determined as a bit opposite to a programmed bit is stored). For example, in the case of distinguishing the erase state "E" and the first programming state P1 in the initial state, the voltage level of the optimized valley may indicate a voltage level at which the number of memory cells having an error bit is minimized, between a voltage level at which the number of memory cells having the erase state "E" is maximized, and a voltage level at which the number of memory cells having the first programming state P1 is maximized. In other words, the voltage level of the optimized valley associated with the erase state "E" and the first programming state P1 in the initial state may be the first initial read voltage level VR1i.

As in the above description, in the initial state, each of second to seventh initial read voltage levels VR2i to VR7i may indicate a voltage level of the valley optimized to distinguish each of the second to seventh programming state P2 to P7 from a previous state (i.e., an immediately previous state having a low threshold voltage distribution).

In the graph of the retention state, a horizontal axis represents a threshold voltage (e.g., a level of a threshold voltage), and a vertical axis represents the number of memory cells. A threshold voltage level of each memory cell may correspond to one of the erase state "E" and the first to seventh programming states P1 to P7. A first retention read voltage level VR1r may be a voltage level of a valley optimized to distinguish memory cells of the erase state "E" from memory cells of the first programming state P1. As in the above description, in the retention state, each of second to seventh retention read voltage levels VR2r to VR7r may indicate a voltage level of the valley optimized to distinguish each of the second to seventh programming state P2 to P7 from a previous state (i.e., an immediately previous state having a low threshold voltage distribution).

Referring to the graph of the initial state and the graph of the retention state together, each of the first to seventh initial read voltage levels VR1i to VR7i may be different from each of the first to seventh retention read voltage levels VR1r to VR7r.

In some implementations, as the threshold voltage level becomes higher, a difference between the voltage level in the retention state and the voltage level in the initial read state may become greater. For example, a difference between the third retention read voltage level VR3r and the third initial read voltage level VR3i may be greater than a difference between the seventh retention read voltage level VR7r and the seventh initial read voltage level VR7i.

In some implementations, a voltage level corresponding to a low threshold voltage state may increase over time. For example, to improve a time during which the reliability of an erase state and plural programming states is guaranteed, memory cells may be programmed to have a voltage level higher than the voltage level of the erase state in a semiconductor process level. In operational use, the memory cell programmed to the erase state may have a property of returning to the voltage level programmed in the semiconductor process level over time. As such, the first retention read voltage level VR1r may be higher than the first initial read voltage level VR1i.

In some implementations, the storage controller 110 of FIG. 1 determines a degradation level by individually obtaining distribution information for each read voltage level in consideration of a degradation trend according to the retention of memory cells.

Figure 6:
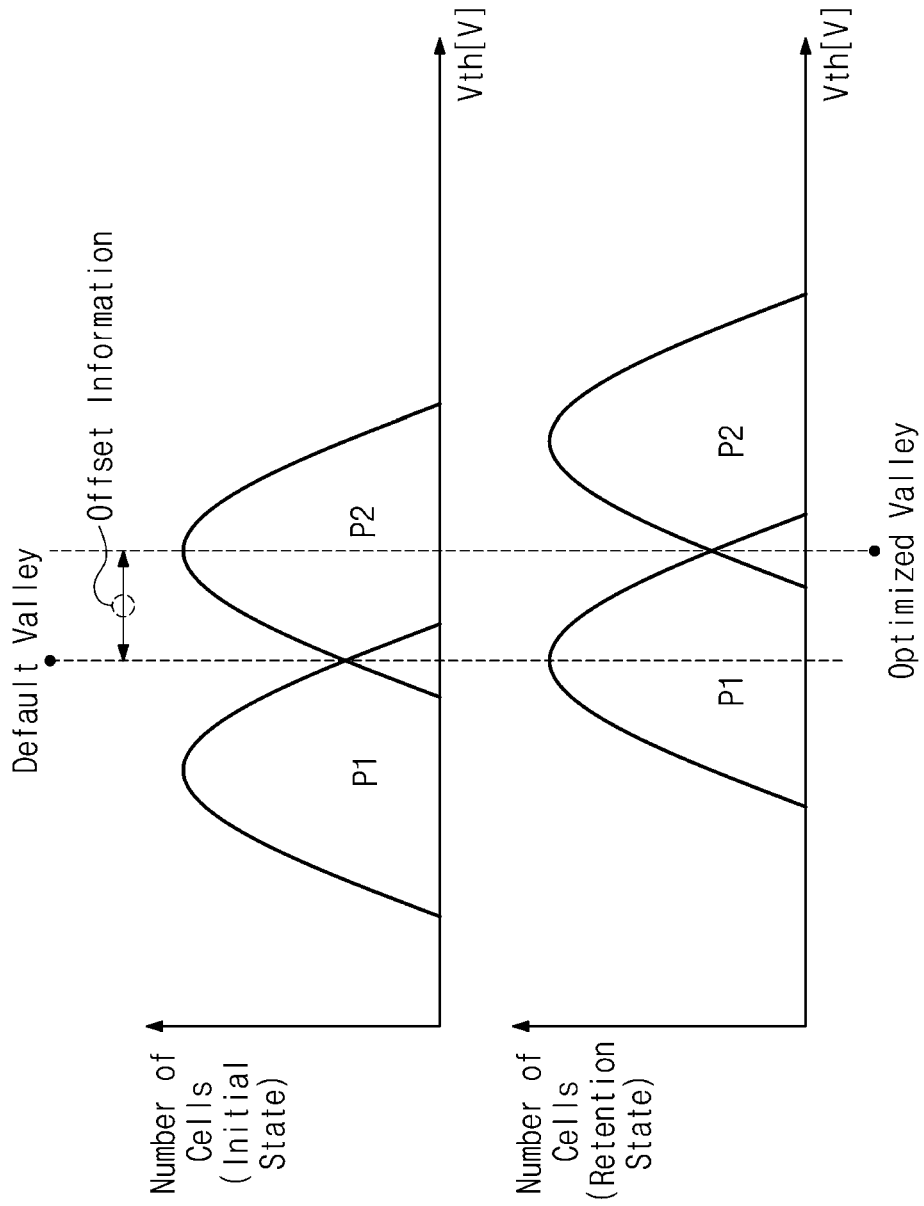
FIG. 6 is a diagram describing an example of offset information.

FIG. 6 is a diagram describing an example of offset information. Some threshold voltage distributions of the initial state and some threshold voltage distributions of the retention state will be described with reference to FIG. 6.

In the graph of the initial state, a horizontal axis represents a threshold voltage, and a vertical axis represents the number of memory cells. A default valley may refer to a voltage level optimized to distinguish memory cells of the first programming state P1 from memory cells of the second programming state P2. In detail, in the initial state, the default valley may indicate a voltage level, at which the number of memory cells having an error bit is minimized, between a voltage level at which the number of memory cells having the first programming state P1 is maximized and a voltage level at which the number of memory cells having the second programming state P2 is maximized.

In the graph of the retention state, a horizontal axis represents a threshold voltage, and a vertical axis represents the number of memory cells. In the retention state, the optimized valley may indicate a voltage level optimized to distinguish memory cells of the first programming state P1 from memory cells of the second programming state P2. In detail, in the retention state, the optimized valley may indicate a voltage level, at which the number of memory cells having an error bit is minimized, between a voltage level at which the number of memory cells having the first programming state P1 is maximized and a voltage level at which the number of memory cells having the second programming state P2 is maximized.

The offset information may indicate a difference between the optimized valley and the default valley. As a time passes from the initial state, the size of the offset information (e.g., a difference between the voltage level of the optimized valley and the voltage level of the default valley) may increase. The storage controller 110 of FIG. 1 may determine the degradation level of memory cells based on the offset information. The offset information may be used to optimize a read voltage level or to determine read reclaim, in a next read operation.

For better understanding of the present disclosure, FIG. 6 shows the case where the voltage level of the optimized valley is higher than the voltage level of the default valley, but the present disclosure is not limited thereto. For example, depending on the number of bits managed by one memory cell, a semiconductor process method, a read voltage level, the voltage level of the optimized valley may be lower than the voltage level of the default valley, and the size of the offset information may increase or decrease.

Figure 7:
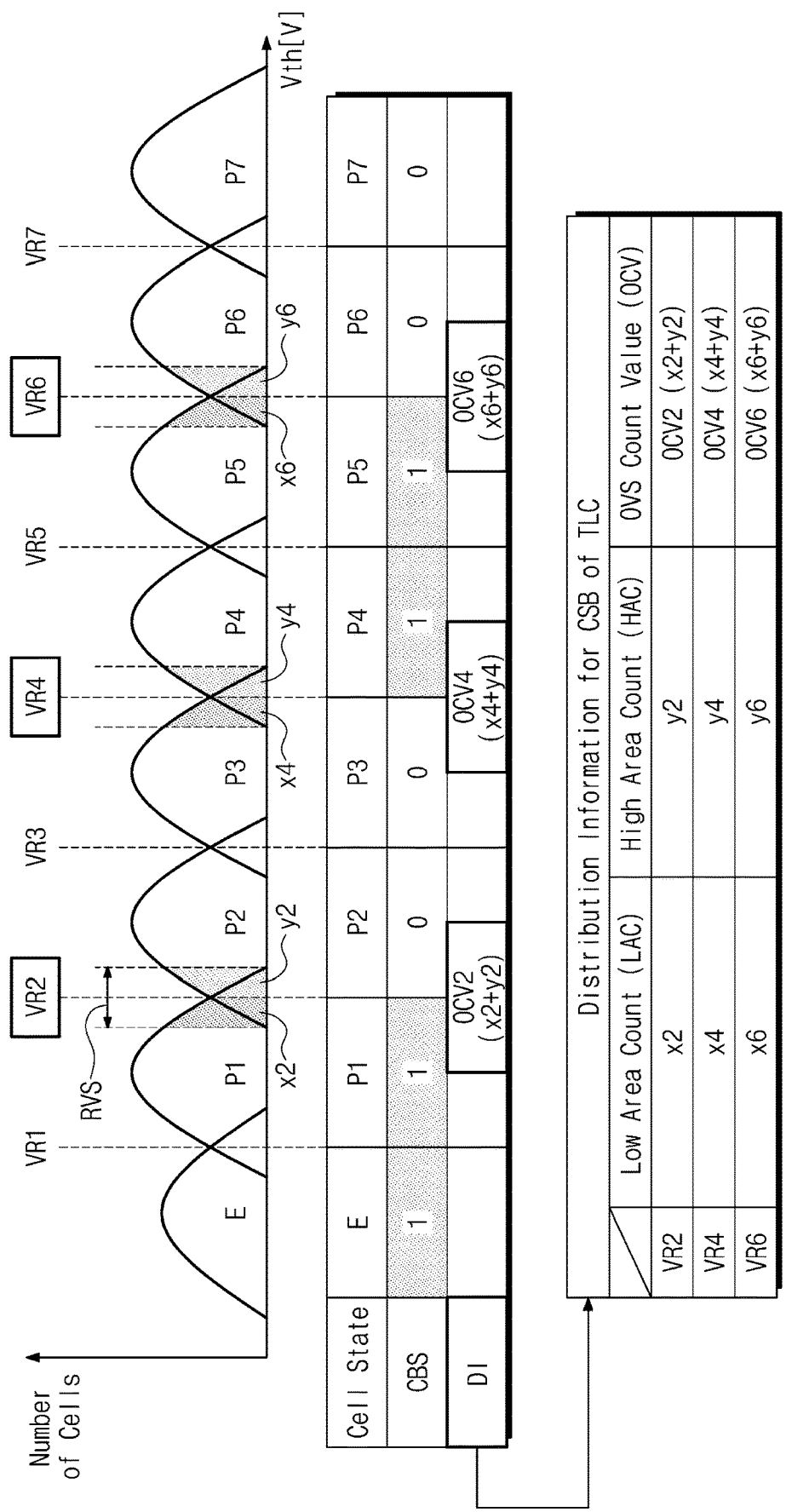
FIG. 7 is a diagram describing an example of distribution information.

FIG. 7 is a diagram describing an example of distribution information. The distribution information may refer to the offset information or the OVS count data. An example where the OVS count data are used as an example of the distribution information in the case of reading the center significant bit CSB of the triple level cell TLC will be described with reference to FIG. 7. The OVS count data may include OVS count values respectively corresponding to read voltages.

In the threshold voltage distribution graph, a horizontal axis represents a threshold voltage, and a vertical axis represents the number of memory cells. The second, fourth, and sixth read voltage levels VR2, VR4, VR6 may correspond to a logical page of the center significant bit CSB of the triple level cell TLC.

Referring to the threshold voltage distribution graph, a reference voltage section RVS can refer to a region between the beginning of a first programming state and end of a second programming state, e.g., the beginning of programming state P2 and the end of programming state P1. "x2" may be a value of the low area count LAC of the second read voltage level VR2. "x2" may be the number of memory cells each having a threshold voltage between the second read voltage level VR2 and the lower bound of the reference voltage section RVS. "y2" may be a value of the high area count HAC of the second read voltage level VR2. "y2" may be the number of memory cells each having a threshold voltage between the second read voltage level VR2 and the upper bound of the reference voltage section RVS. A sum of "x2" and "y2" may be referred to as a "second OVS count value OCV2 of the second read voltage level VR2".

As in the above description, "x4" may be a value of the low area count LAC of the fourth read voltage level VR4. "y4" may be a value of the high area count HAC of the fourth read voltage level VR4. A sum of "x4" and "y4" may be referred to as a "fourth OVS count value OCV4 of the fourth read voltage level VR4". Also, "x6" may be a value of the low area count LAC of the sixth read voltage level VR6. "y6" may be a value of the high area count HAC of the sixth read voltage level VR6. A sum of "x6" and "y6" may be referred to as a "sixth OVS count value OCV6 of the sixth read voltage level VR6".

In some implementations, the distribution information may be implemented with the OVS count data. For example, when the memory cell is implemented with the triple level cell TLC, the OVS count data may include first and fifth OVS count values corresponding to the least significant bit LSB, second, fourth, and sixth OVS count values corresponding to the center significant bit CSB, and third and seventh OVS count values corresponding to the most significant bit MSB.

Figure 8:
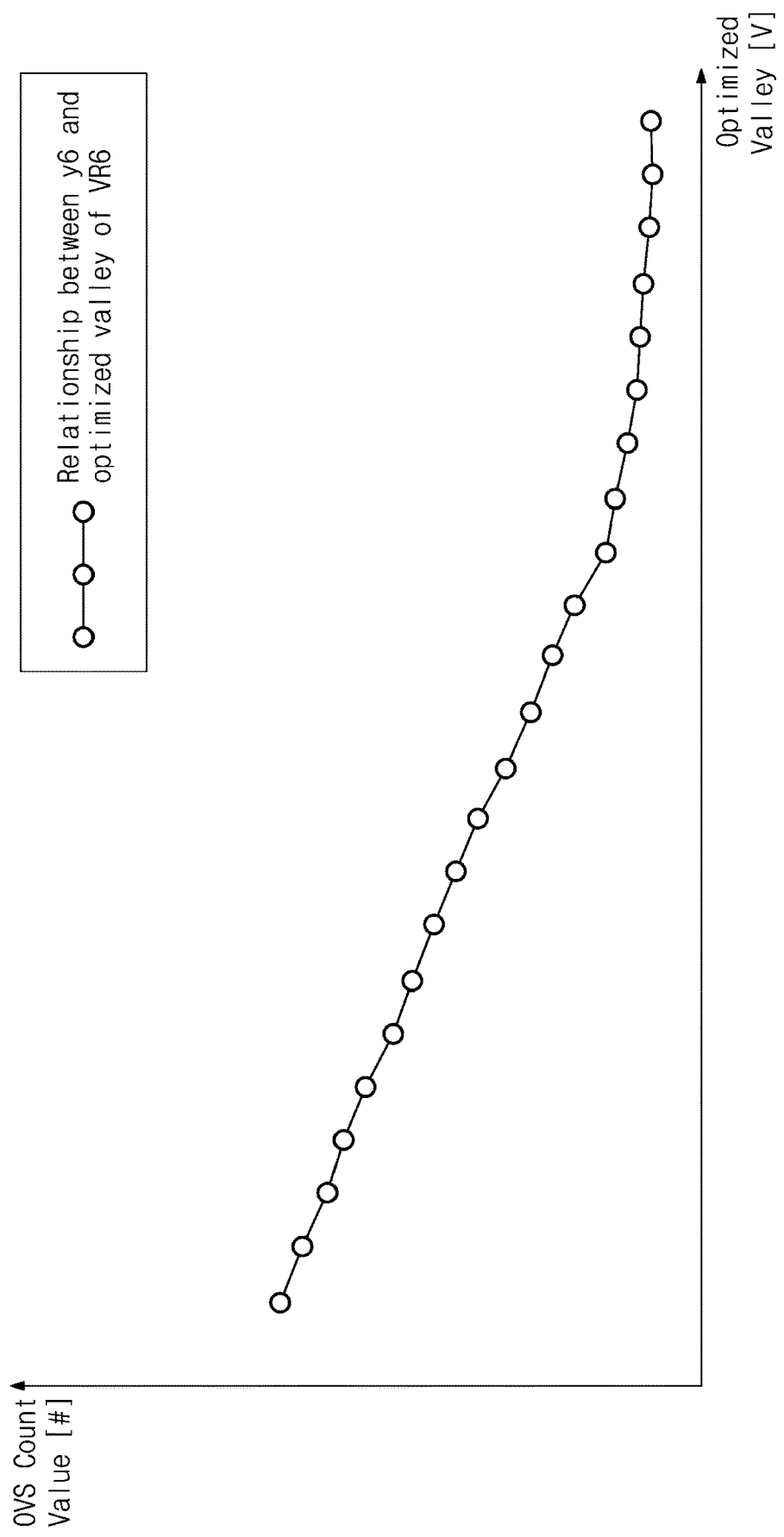
FIG. 8 is a diagram describing an example of a relationship between an optimized valley and an on-chip valley search (OVS) count value.

FIG. 8 is a diagram describing an example of a relationship between an optimized valley and an OVS count value. A relationship between an optimized valley and an OVS count value will be described with reference to FIGS. 7 and 8. In FIG. 8, a horizontal axis represents a threshold voltage, and a vertical axis represents the number of memory cells.

In some implementations, the OVS count value has the correlation with the voltage level of the optimized valley. In detail, the OVS count value may include a count value of the low area count LAC and a count value of the high area count HAC. At least one of the count value of the low area count LAC and the count value of the high area count HAC may have the correlation with the voltage level of the optimized valley. For example, "y6" of the sixth OVS count value OCV6 may have the correlation with the optimized valley of the sixth read voltage level VR6.

The storage controller 110 of FIG. 1 may calculate the voltage level of the optimized valley from the distribution information DI, based on the correlation between the OVS count value and the optimized valley.

Figure 9:
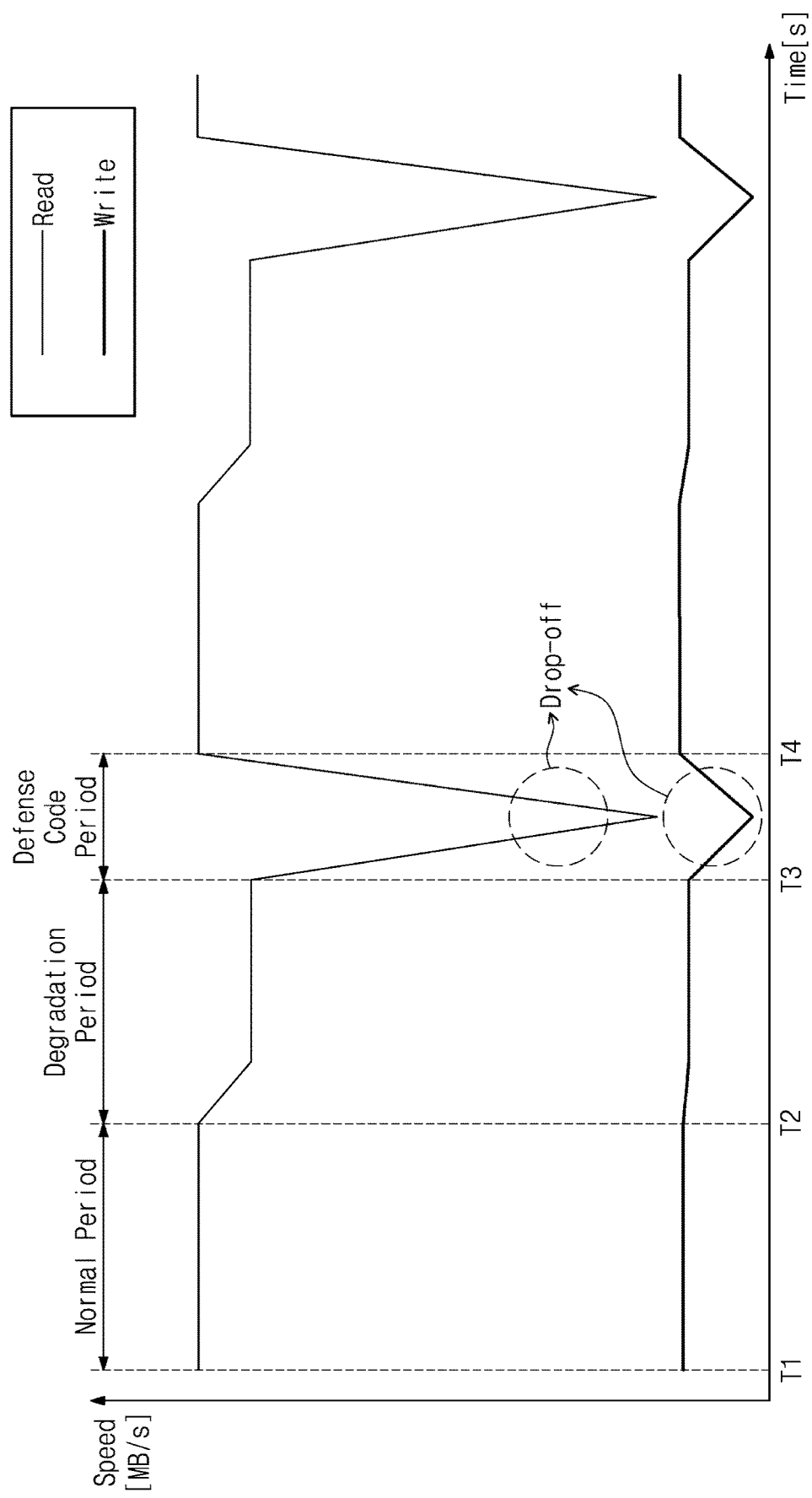
FIG. 9 is a diagram describing an example of a defense code period.

FIG. 9 is a diagram describing an example of a defense code period. Referring to FIGS. 1 and 9, the command manager 111 may be implemented with a firmware module that executes a defense code. Memory cells of the nonvolatile memory device 120 may sequentially operate a normal period, a degradation period, and a defense code period over time.

In this example, the normal period refers to a period in which the degradation of the performance characteristic does not occur; the degradation period refers to a period in which the degradation of the performance characteristic occurs; the defense code period refers to a period in which the defense code is executed after the degradation of the performance characteristic is recognized by the firmware module. The defense code that corresponds to some of instructions stored in the firmware may indicate operations of preventing or recovering an error of data.

In the graph of FIG. 9, a horizontal axis represents a time, and a vertical axis represents a transmission speed. A solid line represents a transmission speed of the read operation. A bold solid line represents a transmission speed of the write operation.

A period from T1 to T2 is referred to as a "normal period." In the normal period, the performance characteristic of the read operation may be maintained uniformly or at almost a uniformly high level, and the performance characteristic of the write operation may be maintained uniformly or at almost a uniformly high level.

A period from T2 to T3 is referred to as a "degradation period." The degradation period may refer to a period in which the degradation of the performance characteristic occurs but the defense code is not executed. In the degradation period, the performance characteristic of the read operation may be somewhat lower than the performance characteristic of the read operation in the normal period, and the performance characteristic of the write operation may be somewhat lower than the performance characteristic of the write operation in the normal period.

A period from T3 to T4 is referred to as a "defense code period." The defense code period may refer to a period in which the performance characteristic is significantly degraded and read reclaim is performed based on the detection of an uncorrectable error. The read reclaim may include operations of reading data from a degraded memory cell, again writing the read data in a new memory cell, and erasing the degraded memory cell. To decrease an error level in the read operation of the degraded memory cell, the firmware module may optimize the read voltage level based on the distribution information DI. That is, the distribution information DI may be required in the defense code period.

In some implementations, in the defense code period, the command manager 111 may execute the defense code with reference to the distribution information DI obtained by a previous read command and stored in the buffer memory of the volatile memory device 113, instead of additionally requesting the distribution information DI from the non-volatile memory device 120.

In other words, the buffer memory of the volatile memory device 113 may continuously receive and back up the distribution information DI whenever the read data are obtained and may provide the backed-up distribution information DI to the firmware module without an additional I/O (i.e., a dummy I/O not associated with the request of the host 11) between the storage controller 110 and the non-volatile memory device 120. As such, the reduction of performance in the defense code period may be suppressed, and the performance and life time of the storage device 100 may be improved.

Figure 10:
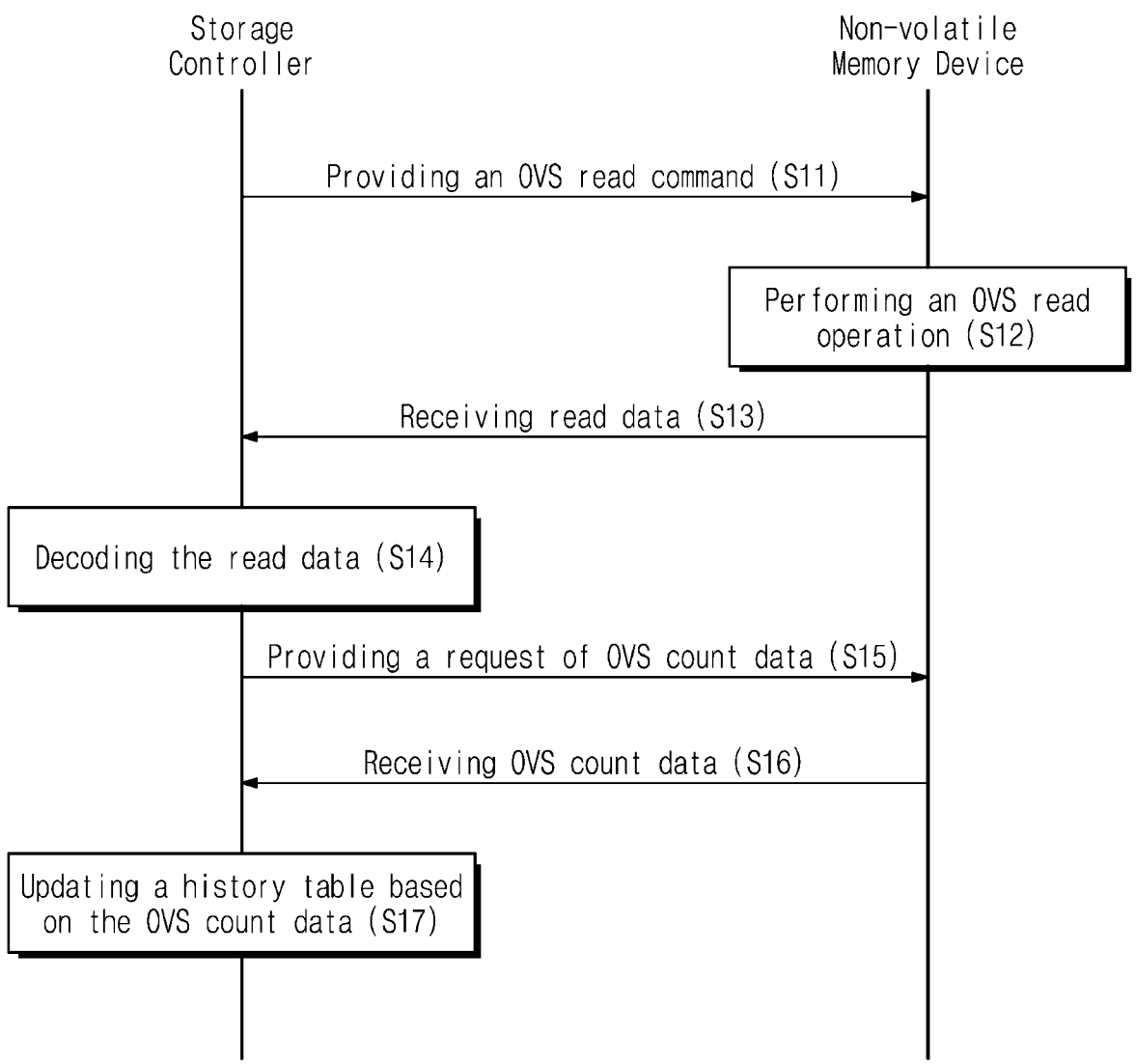
FIG. 10 is a flowchart describing an example of a method of operating a conventional storage device.

FIG. 10 is a flowchart describing an example of a method of operating a conventional storage device. The conventional storage device is provided for better understanding of the present disclosure and is not intended to limit the scope of the present disclosure. The conventional storage device may include characteristics not disclosed in the prior arts or characteristics associated with the present disclosure.

Referring to FIG. 10, the storage device may include a storage controller and a non-volatile memory device.

In operation S11, the storage controller provides the OVS read command to the non-volatile memory device. The OVS read command may be used to request the read data stored in the non-volatile memory device and the OVS count data indicating the degradation level of memory cells storing the read data, from the non-volatile memory device. The OVS count data may be also referred to as "distribution information."

In operation S12, the non-volatile memory device performs the OVS read operation. The non-volatile memory device may generate the read data and the OVS count data corresponding to the OVS read operation.

In operation S13, the storage controller receives the read data from the non-volatile memory device.

In operation S14, the storage controller decodes the read data. For example, the storage controller may determine that the error of the read data is correctable, based on a result of performing ECC decoding on the read data.

In operation S15, the storage controller provides the request for the OVS count data to the non-volatile memory device.

In operation S16, the storage controller receives the OVS count data from the non-volatile memory device.

In operation S17, the storage controller updates the history table based on the OVS count data. The updated history table may be used to adjust the read voltage level in a next read operation.

As described above, the conventional storage device may request the read data and the OVS count data independently of each other. The conventional storage device may perform the additional read operation to obtain the distribution information (i.e., the OVS count data), thereby causing an increase in the I/O load and the latency.

Figure 11:
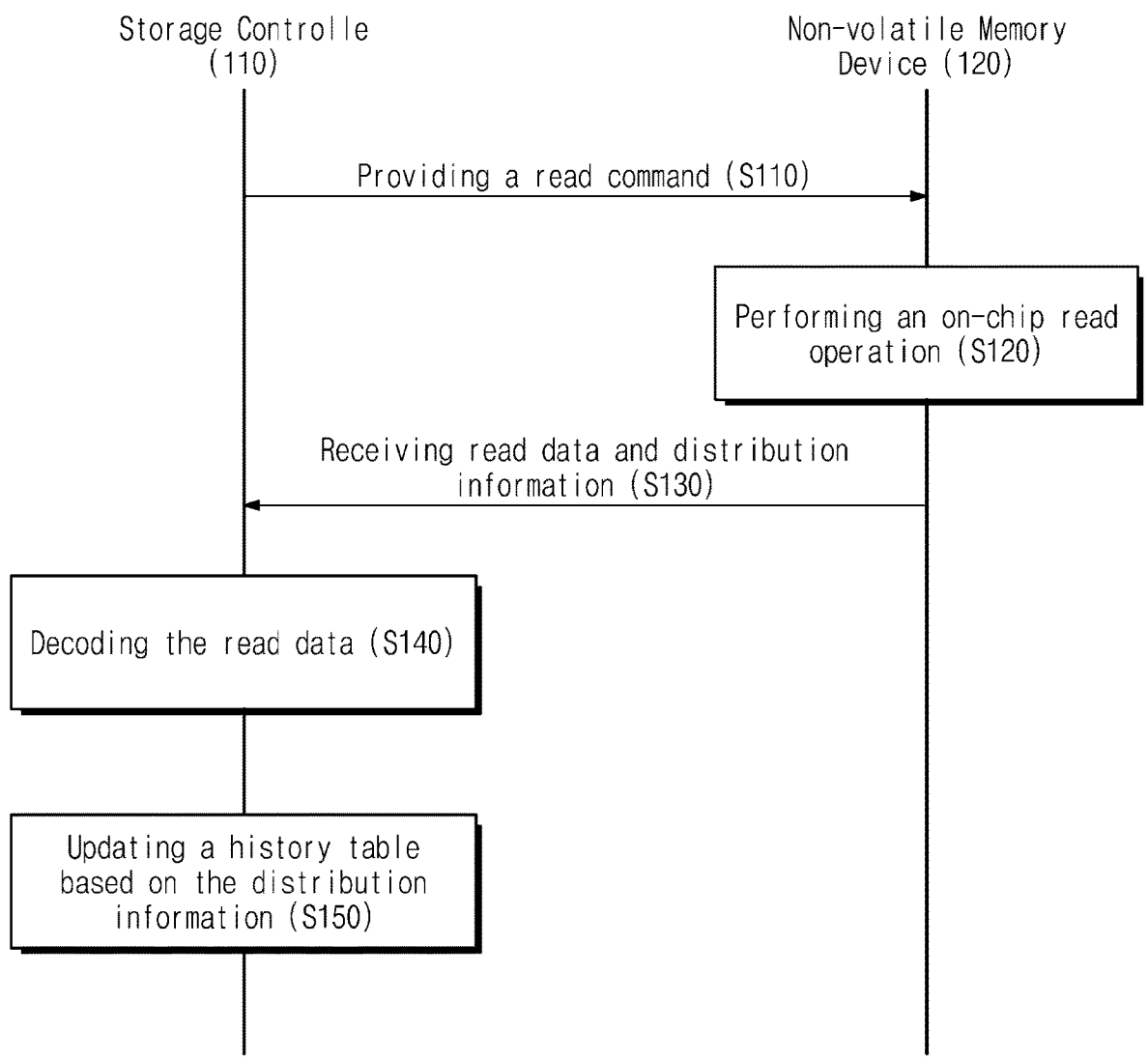
FIG. 11 is a flowchart describing an example of a method of operating a storage device.

FIG. 11 is a flowchart describing an example of a method of operating a storage device. The storage device may correspond to the storage device 100 of FIG. 1. Referring to FIGS. 1 and 11, the storage device 100 may include the storage controller 110 and the non-volatile memory device 120.

In operation S110, the storage controller 110 provides the read command to the non-volatile memory device 120. The read command may indicate the on-chip read operation of the non-volatile memory device 120.

In some implementations, the non-volatile memory device 120 is configured to return the read data and the distribution information always together in response to the read command. For example, the read command may be based on the request from the host 11, not the dummy read command for obtaining only the distribution information.

In operation S120, the non-volatile memory device 120 performs the on-chip read operation. The non-volatile memory device 120 may generate the read data and the distribution information based on the on-chip read operation.

In some implementations, the distribution information includes memory cell count values. For example, the distribution information may refer to the OVS count data. The distribution information may include OVS count values corresponding to a plurality of read voltages. Each of the OVS count values may include a count value of the low area count LAC and a count value of the high area count HAC.

In some implementations, the distribution information includes offset information. For example, the distribution information may be offset information predicted based on the correlation between the OVS count data and the optimized valley. As another example, the distribution information may be offset information that is based on the optimized valley found by the SHP (super-high performance)-LRE manner. The SHP-LRE manner may refer to a manner in which the optimized valley is found by using the count values obtained in the on-chip read operation.

In operation S130, the storage controller 110 receives the read data and the distribution information from the non-volatile memory device 120. The buffer memory of the storage controller 110 may store the read data and the distribution information.

In some implementations, the storage controller 110 continuously receives the read data and the distribution information from the non-volatile memory device 120. For example, the storage controller 110 may receive the read data and the distribution information in real time every read command. Except for the read command, a separate additional read command only for the distribution information may not be required. The read data and the distribution information may be continuously transferred between the storage controller 110 and the non-volatile memory device 120.

In operation S140, the storage controller 110 decodes the read data. For example, the storage controller 110 may determine that the error of the read data is correctable, based on a result of performing ECC decoding on the read data. The storage controller 110 may return the decoded read data to the host 11.

In operation S150, the storage controller 110 updates the history table based on the distribution information. Instead of separately issuing an additional request for the distribution information to the non-volatile memory device 120, the storage controller 110 may update the history table with reference to the distribution information backed up to the buffer memory of the storage controller 110 in operation S130. That is, the storage controller 110 may obtain the distribution information without an additional read command or a dummy I/O except for the read command in operation S110. Accordingly, the internal I/O load and the latency of the storage device may decrease.

Figure 12:
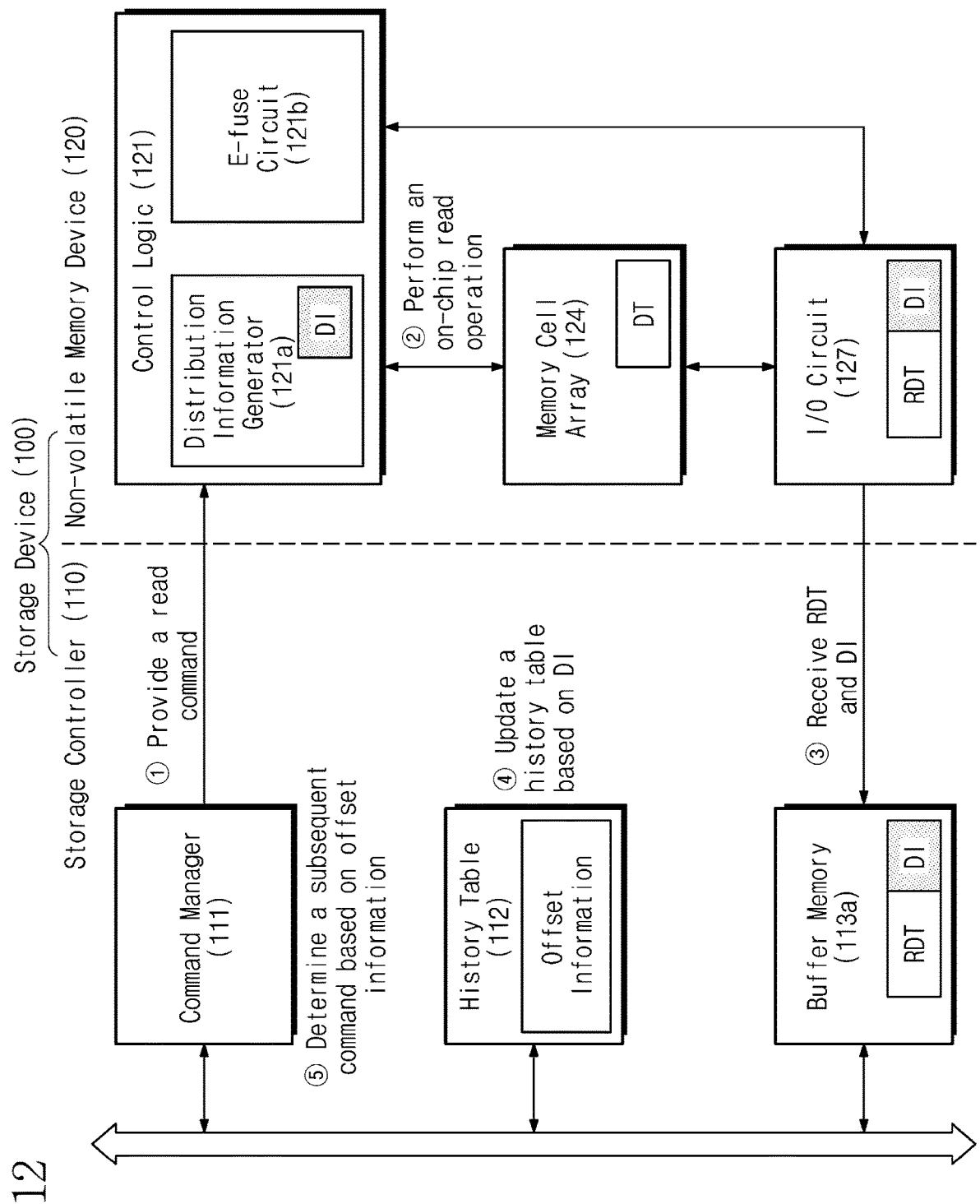
FIG. 12 is a diagram describing an example of a method of operating a storage device.

FIG. 12 is a diagram describing an example of a method of operating a storage device. The storage device may correspond to the storage device 100 of FIG. 1. Referring to FIGS. 1 and 12, the storage device 100 may include the storage controller 110 and the non-volatile memory device 120.

The storage controller 110 may include the command manager 111, the history table 112, and the buffer memory 113a. The non-volatile memory device 120 may include the control logic 121, the memory cell array 124, and the I/O circuit 127. The control logic 121 may include the distribution information generator 121a and the E-fuse circuit 121b.

Below, the method of operating the storage device 100 detail will be described.

In a first operation ①, the command manager 111 provides the read command to the non-volatile memory device 120. The read command may indicate the on-chip read operation based on the target read voltage level. The target read voltage level may be used to determine a bit value of data DT stored in the memory cell array 124 in the on-chip read operation.

In a second operation ②, the control logic 121 performs the on-chip read operation based on the read command. For example, the memory cells of the memory cell array 124 may store the data DT. The data DT may be data that are stored based on a previous write command. The control logic 121 may generate read data RDT and the distribution information DI by performing the on-chip read operation on the data DT based on the target read voltage level of the read command. The control logic 121 may provide the read data RDT and the distribution information DI to the I/O circuit 127.

At the time at which the on-chip read operation is performed, threshold voltage distributions of the memory cells of the memory cell array 124 storing the data DT may be different from the threshold voltage distributions of the initial state. The read data RDT may refer to data that are generated by determining the bit value of the data DT based on the target read voltage level. A series of bits corresponding to the read data RDT may include an error bit (i.e., a bit value different from a programmed bit value of the initial state). The distribution information DI may correspond to the read data RDT. The distribution information DI may indicate the degradation level (e.g., the number of error bits) of memory cells of the memory cell array 124, which is determined based on the target read voltage level of the read command.

In some implementations, the distribution information generator 121a of the control logic 121 generates the distribution information DI based on the on-chip read operation. For example, the control logic 121 may generate the read data RDT by determining the bit value of the data DT of the memory cell array 124 based on the target read voltage level of the read command. The distribution information generator 121a may generate the distribution information DI as the byproduct of the read data RDT while obtaining the read data RDT.

In some implementations, the distribution information generator 121a updates the E-fuse circuit 121b based on the distribution information DI. For example, the distribution information generator 121a may store the distribution information DI in the E-fuse circuit 121b. Alternatively, the distribution information generator 121a may generate the offset information as the distribution information and may store the offset information in the E-fuse circuit 121b. The updated distribution information DI of the E-fuse circuit 121b may be used in a next read operation.

In a third operation ③, the buffer memory 113a of the storage controller 110 receives the read data RDT and the distribution information DI from the I/O circuit 127 of the non-volatile memory device 120. The read data RDT may correspond to the read command of the first operation ①. The storage controller 110 may obtain both the read data RDT and the distribution information DI without providing any other command (e.g., an additional read command only for the distribution information DI) except for the read command to the non-volatile memory device 120. Accordingly, the I/O load between the storage controller 110 and the non-volatile memory device 120 may decrease.

In a fourth operation ④, the command manager 111 updates the history table 112 based on the distribution information DI. For example, the command manager 111 may receive the distribution information DI from the buffer memory 113a. The command manager 111 may generate the offset information based on the distribution information DI. The command manager 111 may store the offset information in the history table 112. As another example, in the case where the distribution information DI is implemented with the offset information, the command manager 111 may send the distribution information DI of the buffer memory 113a to the history table 112. The history table 112 may store the final offset information.

In a fifth operation ⑤, the command manager 111 determines a next command based on the offset information of the history table 112. For example, the command manager 111 may optimize the target read voltage level based on the offset information and may issue the next read command indicating the optimized read voltage level. As the voltage level of the optimized valley is applied to the target read voltage level, the number of times that the read retry occurs in the next read operation may decrease.

As another example, the command manager 111 may execute the defense code preventing an error of data and may perform the read reclaim operation with reference to the offset information before the uncorrectable error occurs.

Figure 13:
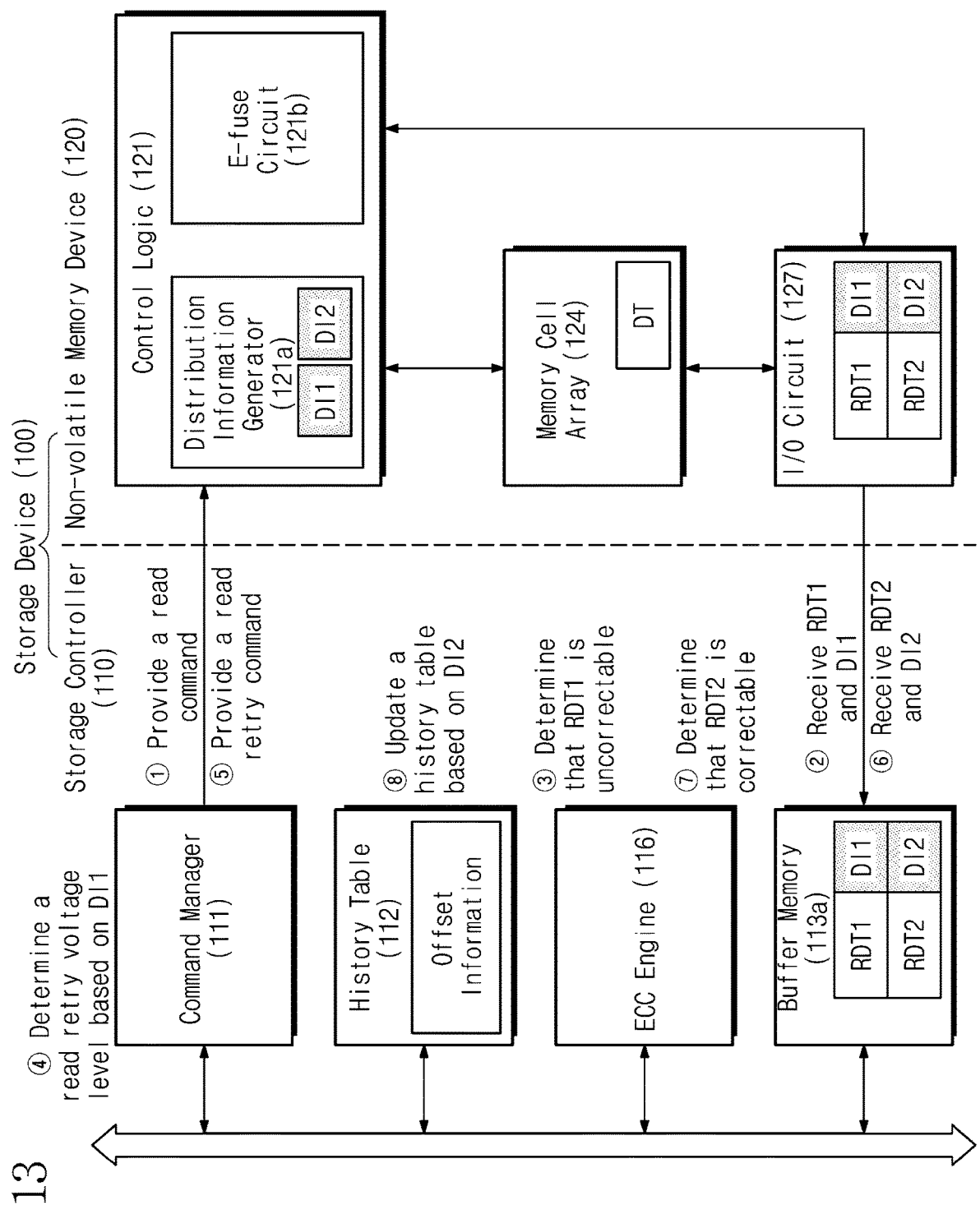
FIG. 13 is a diagram describing an example of a method of operating a storage device.

FIG. 13 is a diagram describing an example of a method of operating a storage device. The storage device may correspond to the storage device 100 of FIG. 1. Referring to FIGS. 1 and 13, the storage device 100 may include the storage controller 110 and the non-volatile memory device 120.

The storage controller 110 may include the command manager 111, the history table 112, the buffer memory 113a, and the ECC engine 116. The non-volatile memory device 120 may include the control logic 121, the memory cell array 124, and the I/O circuit 127. The control logic 121 may include the distribution information generator 121a and the E-fuse circuit 121b.

Below, the method of operating the storage device 100 will be described in detail.

In a first operation ①, the command manager 111 provides the read command to the non-volatile memory device 120. The read command may indicate the on-chip read operation based on the target read voltage level.

The non-volatile memory device 120 may receive the read command from the command manager 111. The control logic 121 may perform the on-chip read operation based on the read command. The control logic 121 may generate first read data RDT1 and first distribution information DI1 by performing the on-chip read operation on the data DT based on the target read voltage level of the read command. The control logic 121 may provide the first read data RDT1 and the first distribution information DI1 to the I/O circuit 127.

The first read data RDT1 may refer to data that are generated by determining the bit value of the data DT based on the target read voltage level. The first distribution information DI1 may indicate the degradation level (e.g., the number of error bits) of memory cells of the memory cell array 124, which is determined based on the target read voltage level of the read command.

In a second operation ②, the buffer memory 113a of the storage controller 110 receives the first read data RDT1 and the first distribution information DI1 from the I/O circuit 127 of the non-volatile memory device 120.

In a third operation ③, the ECC engine 116 fetches the first read data RDT1 among the first read data RDT1 and the first distribution information DI1 from the buffer memory 113a. The ECC engine 116 may perform de-randomization and decoding on the first read data RDT1. The error of the first read data RDT1 may be uncorrectable by the ECC engine 116. The command manager 111 may determine that the error of the first read data RDT1 is uncorrectable, based on the communication with the ECC engine 116.

In a fourth operation ④, the command manager 111 receives the first distribution information DI1 from the buffer memory 113a. The command manager 111 may determine a read retry voltage level based on the first distribution information DI1. The read retry voltage level may correspond to a result of optimizing the target read voltage level depending on a change in a threshold voltage distribution of memory cells of the memory cell array 124 based on the first distribution information DI1.

In a fifth operation ⑤, the command manager 111 provides the read retry command to the non-volatile memory device 120. The read retry command may indicate the on-chip read operation that is based on the read retry voltage level.

The non-volatile memory device 120 may receive the read retry command from the command manager 111. The control logic 121 may perform the on-chip read operation based on the read retry command. The control logic 121 may generate second read data RDT2 and second distribution information DI2 by performing the on-chip read operation on the data DT based on the read retry voltage level of the read retry command.

Because the read retry voltage level is different from the target read voltage level of the read command in the first operation ①, the second read data RDT2 and the second distribution information DI2 may be different from the first read data RDT1 and the first distribution information DI1. The control logic 121 may provide the second read data RDT2 and the second distribution information DI2 to the I/O circuit 127.

In a sixth operation ⑥, the buffer memory 113a of the storage controller 110 receives the second read data RDT2 and the second distribution information DI2 from the I/O circuit 127 of the non-volatile memory device 120.

In a seventh operation ⑦, the ECC engine 116 fetches the second read data RDT2 among the second read data RDT2 and the second distribution information DI2 from the buffer memory 113a. The ECC engine 116 may perform de-randomization and decoding on the second read data RDT2. The error of the second read data RDT2 may be correctable by the ECC engine 116. The command manager 111 may determine that the error of the second read data RDT2 is correctable, based on the communication with the ECC engine 116.

In an eighth operation ⑧, the command manager 111 may update the history table 112 based on the second distribution information DI2. For example, the command manager 111 may update the offset information of the history table 112 based on the second distribution information DI2 of the buffer memory 113a. The history table 112 may store the final offset information. The offset information of the history table 112 may be used for the command manager 111 to generate a next command.

Figure 14:
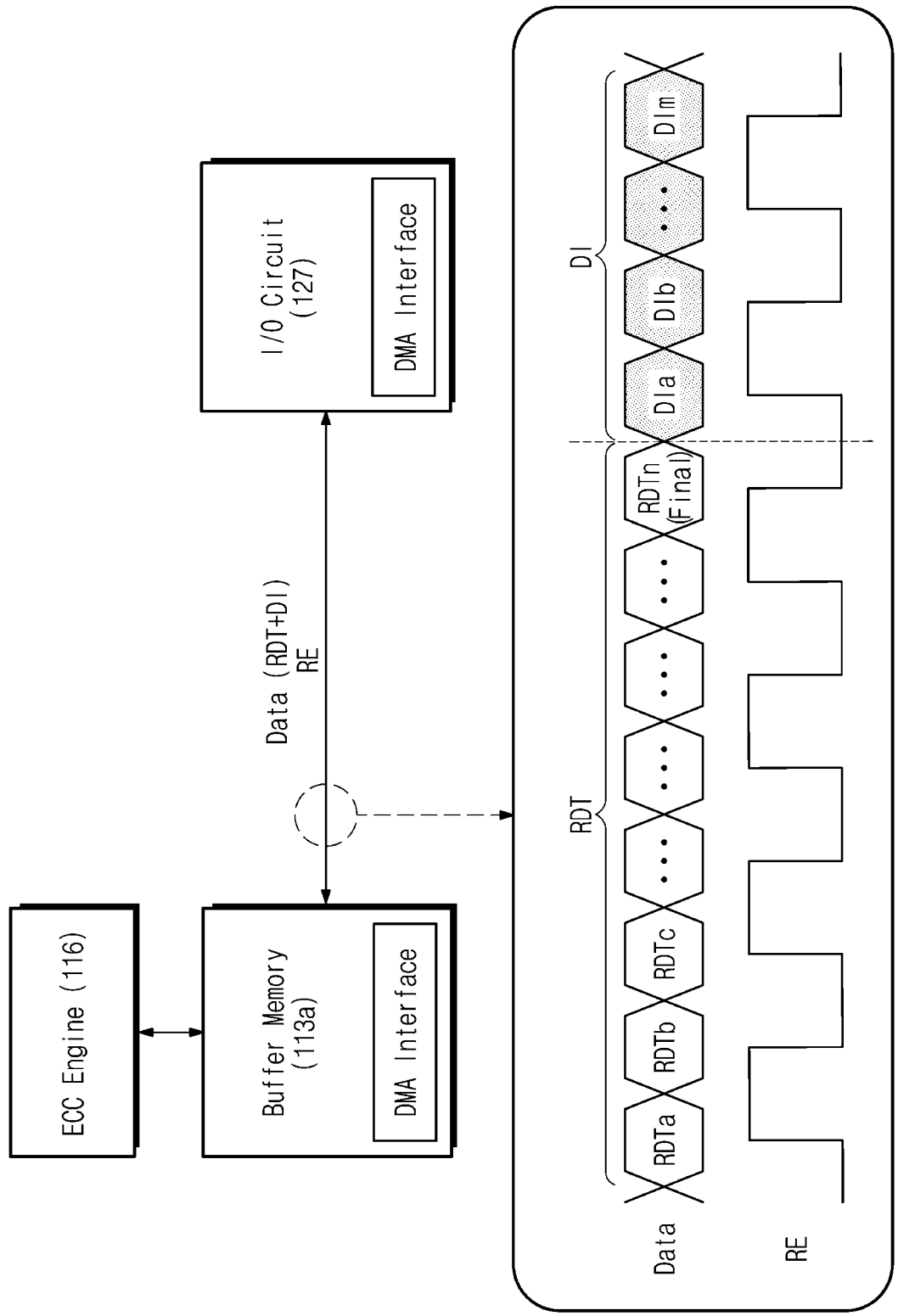
FIG. 14 is a diagram describing an example of internal communication of a storage device.

FIG. 14 is a diagram describing an example of internal communication of a storage device. Referring to FIG. 14, the storage device 100 may include the buffer memory 113a, the ECC engine 116, and the I/O circuit 127.

The buffer memory 113a may perform direct memory access (DMA) communication with the ECC engine 116. For example, the buffer memory 113a may include a DMA interface. The I/O circuit 127 may include a DMA interface. The DMA interface of the buffer memory 113a and the DMA interface of the I/O circuit 127 may support the DMA communication.

The DMA communication may be used to send a data signal and a read enable signal RE. The data signal may include the read data RDT and the distribution information DI. The read data RDT may include a plurality of read data bits RDTa to RDTn. The distribution information DI may include a plurality of distribution information bits DIa to DIm. The read enable signal RE may be a clock signal that is used to determine the data signal. For example, values of bits included in the data signal may be determined at the rising edge and the falling edge of the read enable signal RE.

The ECC engine 116 may identify the read data RDT from the data signal of the buffer memory 113a and may perform de-randomization and decoding on the read data RDT. For example, the number of read data bits RDTa to RDTn may be defined by the communication protocol of the buffer memory 113a and the ECC engine 116. The buffer memory 113a may provide the ECC engine 116 with the read data RDT of the data signal, based on the read enable signal RE and the number of bits defined by the communication protocol. The ECC engine 116 may perform de-randomization and decoding on the read data RDT. Because the distribution information DI indicates the degradation level of memory cells regardless of randomize and encoding, the ECC engine 116 may not perform de-randomization and decoding on the distribution information DI.

Figure 15:
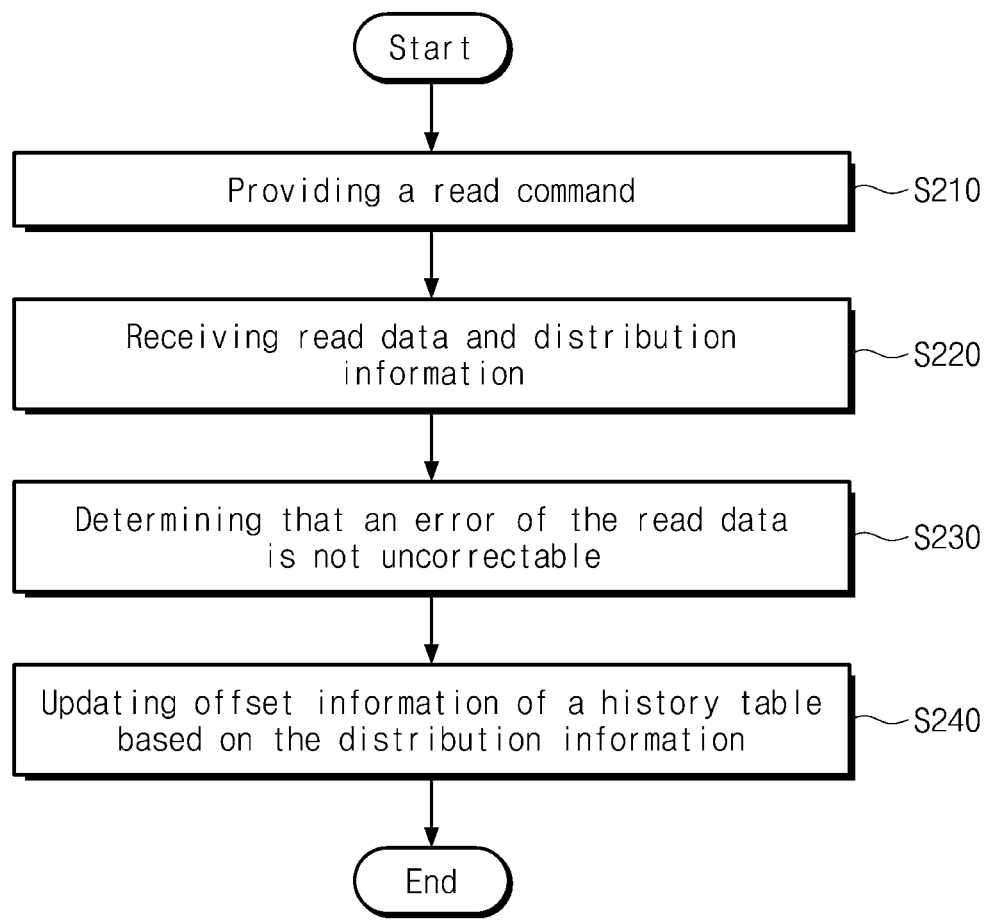
FIG. 15 is a flowchart describing an example of a method of operating a storage controller.

FIG. 15 is a flowchart describing an example of a method of operating a storage controller. A method of operating a storage controller will be described with reference to FIG. 15. The storage controller may communicate with a host and a non-volatile memory device. The storage controller may correspond to the storage controller 110 described with reference to FIGS. 1, 2, 11, 12, and 13.

In operation S210, the storage controller provides the read command to the non-volatile memory device. The non-volatile memory device may support the on-chip read operation. The read command may indicate the on-chip read operation based on the target read voltage level. The on-chip read operation may be implemented with the OVS read operation or the on-chip valley search operation according to the SHP-LRE manner. The non-volatile memory device may generate distribution information based on the on-chip read operation and may update the distribution information in an E-fuse circuit of the non-volatile memory device.

In operation S220, the storage controller receives read data and the distribution information from the non-volatile memory device. For example, the storage controller may receive both the read data and the distribution information without providing the non-volatile memory device with any other command except for the read command in operation S210.

The distribution information may include count values or the offset information generated based on the on-chip read operation. The count values may have the correlation with the voltage level of the optimized valley at the time when the read command is processed. The offset information may indicate a difference between the voltage level of the optimized valley at the time when the non-volatile memory device processes the read command and the voltage level of the default valley at the initial time.

In some implementations, the buffer memory of the storage controller stores the read data and the distribution information. For example, the buffer memory of the storage controller may receive the read data and the distribution information from the non-volatile memory device.

In some implementations, the storage controller receives the read data and the distribution information from the non-volatile memory device based on the DMA communication.

In operation S230, the storage controller determines that the error of the read data is correctable. For example, the ECC engine of the storage controller may perform ECC decoding on the read data. The error of the read data may be corrected by the ECC decoding.

In operation S240, the storage controller updates the offset information of the history table based on the distribution information. The offset information of the history table may be used to generate a next command. For example, after operation S240, the storage controller may optimize the target read voltage level based on the offset information of the history table and may generate a next read command.

In some implementations, the read command is based on the request of the host. For example, the method of operating the storage controller may further include generating the read command based on the request of the host before performing operation S210. The method of operating the storage controller may further include providing the host with the decoded read data after operation S230.

Figure 16:
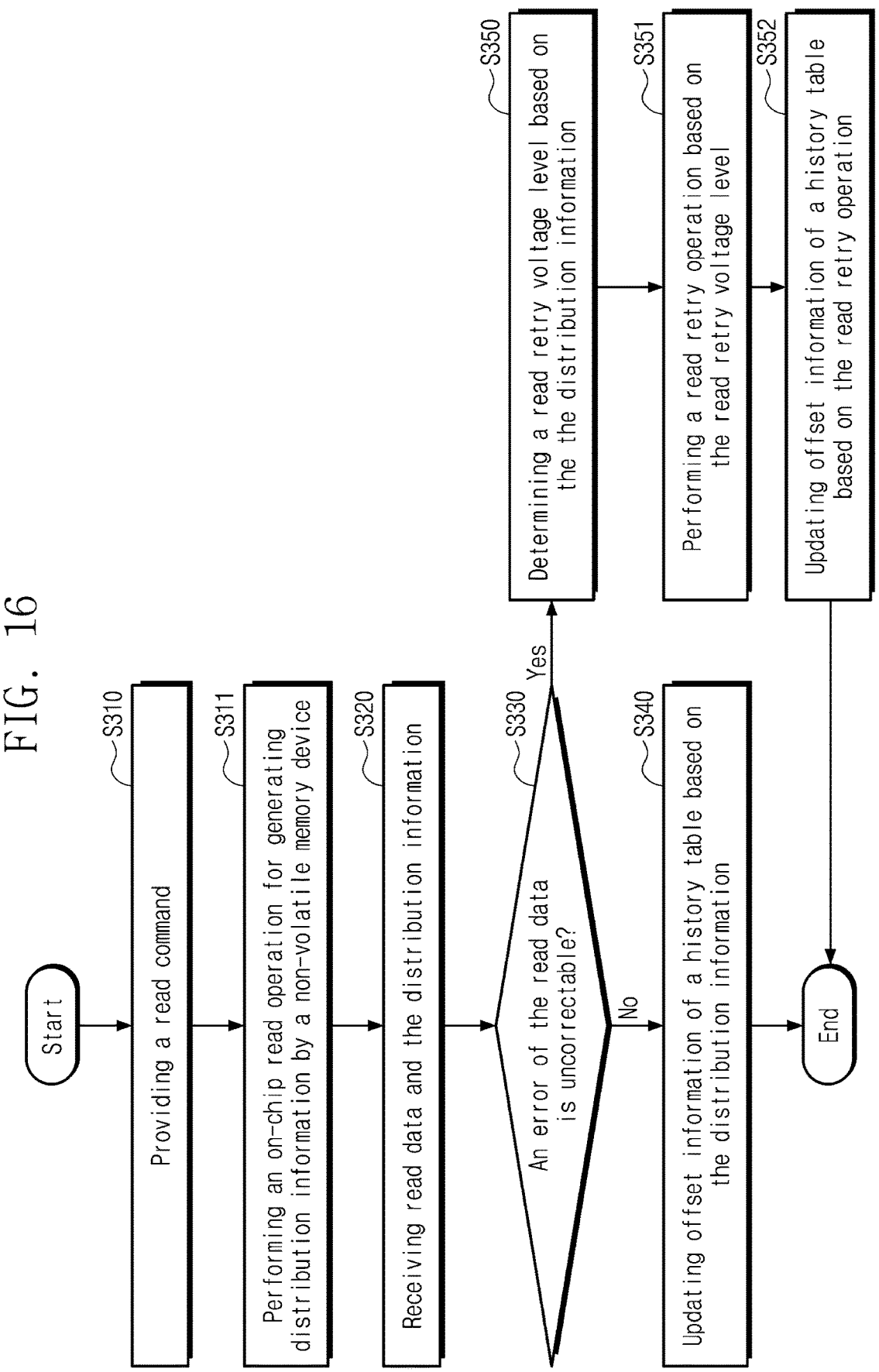
FIG. 16 is a flowchart describing an example of a method of operating a storage device.

FIG. 16 is a flowchart describing an example of a method of operating a storage device. A method of operating a storage device will be described with reference to FIG. 16. The storage device may communicate with a host. The storage device may include a storage controller and a non-volatile memory device. The storage device may correspond to the storage device 100 of FIGS. 1, 2, 11, 12, and 13.

In operation S310, the storage controller of the storage device provides the read command to the non-volatile memory device.

In operation S311, the non-volatile memory device of the storage device performs the on-chip read operation to generate the distribution information. The non-volatile memory device may generate the read data and the distribution information.

In operation S320, the storage controller of the storage device receives the read data and the distribution information from the non-volatile memory device. The read data and the distribution information may be stored in the buffer memory of the storage controller.

In operation S330, the storage controller of the storage device determines whether an error of the read data is uncorrectable. When the storage controller determines that the error of the read data is correctable, the storage device performs operation S340.

In operation S340, the storage controller of the storage device updates the offset information of the history table based on the distribution information.

Returning to operation S330, when the storage controller determines that the read data is uncorrectable, the storage controller performs operation S350.

In operation S350, the storage controller of the storage device determines the read retry voltage level based on the distribution information.

In operation S351, the storage controller of the storage device performs the read retry operation based on the read retry voltage level. For example, operation S360 may include providing the read retry command indicating the read retry voltage level to the non-volatile memory device by the storage controller, generating another read data and another distribution information based on the read retry command by the non-volatile memory device, and receiving the another read data and the another distribution information corresponding to the read retry command from the non-volatile memory device by the storage controller.

In operation S352, the storage device updates the offset information of the history table based on the read retry operation. For example, operation S370 may include determining whether an error of the another read data corresponding to the read retry command is uncorrectable by the storage controller, and updating the offset information of the history table based on the another distribution information corresponding to the read retry command in response to determining that the error of the another read data is correctable by the storage controller.

In some implementations, a storage controller receiving read data and distribution information, a method of operating the same, and a method of operating a storage device including the same are provided.

In some implementations, a storage controller which obtains both the read data and the distribution information based on the read command and determines a next operation without an additional read operation of the non-volatile memory device such that the I/O load and the latency decrease, the reduction of performance is suppressed, and the reliability is improved, a method of operating the storage controller, and a method of operating a storage device including the storage controller are provided.

While the present disclosure has been described with reference to examples thereof, it will be apparent to those of ordinary skill in the art that various changes and modifications may be made thereto without departing from the spirit and scope of the present disclosure as set forth in the following claims.

What is claimed is:

1. A method of operating a storage controller that communicates with a non-volatile memory device, the method comprising:
providing, by the storage controller, a read command to the non-volatile memory device;
while receiving first read data, concurrently receiving first distribution information corresponding to the first read data from the non-volatile memory device;
determining, based on the first read data, whether an error of the first read data is correctable; and
performing a subsequent operation subsequent to determining whether the error of the first read data is correctable, wherein performing the subsequent operation includes
subsequent to determining that the error of the first read data is correctable, updating offset information of a history table in the storage controller based on the first distribution information, or
subsequent to determining that the error of the first read data is not correctable, determining a read retry voltage level based on the first distribution information.

2. The method of claim 1, wherein the storage controller communicates with a host,
wherein the method comprises:
before providing the read command, generating, by the storage controller, the read command based on a request from the host; and
subsequent to determining that the error of the first read data is correctable, providing the first read data to the host.

3. The method of claim 1, wherein, while receiving the first read data, concurrently receiving the first distribution information corresponding to the first read data from the non-volatile memory device includes:
receiving the first read data and the first distribution information without sending another command, other than the read command, to the non-volatile memory device.

4. The method of claim 1, wherein the non-volatile memory device is configured to perform an on-chip read operation based on a target read voltage level of the read command, and
wherein the first distribution information includes the offset information or count values generated based on the on-chip read operation.

5. The method of claim 4, wherein the on-chip read operation includes an on-chip valley search (OVS) read operation, and
wherein the count values of the first distribution information include:
a first count value indicating a number of memory cells whose respective threshold voltages are between the target read voltage level and a lower bound of a reference voltage section; and
a second count value indicating a number of memory cells whose threshold voltages are between the target read voltage level and an upper bound of the reference voltage section.

6. The method of claim 5, wherein at least one of the first count value and the second count value has a correlation with a voltage level of an optimized valley,
wherein the target read voltage level distinguishes memory cells of a first state from memory cells of a second state, and
wherein the voltage level of the optimized valley is (i) between a first voltage level at which a number of memory cells of the first state is maximized and a second voltage level at which a number of memory cell of the second state is maximized and (ii) at a voltage at which a number of memory cells having an error bit is minimized.

7. The method of claim 1, wherein the offset information indicates a difference between a voltage level of an optimized valley at a time when the non-volatile memory device processes the read command and a voltage level of a default valley at an initial time.

8. The method of claim 1, wherein, while receiving the first read data, concurrently receiving the first distribution information corresponding to the first read data from the non-volatile memory device includes:
receiving the first read data and the first distribution information by a buffer memory of the storage controller.

9. The method of claim 8, wherein receiving the first read data and the first distribution information by the buffer memory of the storage controller includes:
receiving the first read data and the first distribution information based on a direct memory access (DMA) communication between the buffer memory and the non-volatile memory device.

10. The method of claim 8, wherein determining whether the error of the first read data is correctable includes:
fetching the first read data among the first read data and the first distribution information of the buffer memory by an error correcting code (ECC) engine of the storage controller;
performing de-randomization and decoding on the first read data thus fetched; and
determining whether the error of the first read data is correctable, based on the de-randomization and the decoding.

11. The method of claim 1, comprising:
optimizing a target read voltage level based on the offset information of the history table; and
providing the non-volatile memory device with a next read command indicating the optimized target read voltage level.

12. The method of claim 11, wherein optimizing the target read voltage level based on the offset information of the history table includes:
optimizing the target read voltage level without providing, to the non-volatile memory device, another command in addition to the read command.

13. The method of claim 1, comprising, when it is determined that the error of the first read data is not correctable:
performing a read retry operation based on the read retry voltage level; and
updating the offset information of the history table based on the read retry operation.

14. The method of claim 13, wherein performing the read retry operation based of the read retry voltage level includes:
providing the non-volatile memory device with a read retry command indicating the read retry voltage level; and
while receiving second read data, concurrently receiving second distribution information corresponding to the second read data from the non-volatile memory device.

15. The method of claim 14, wherein updating the offset information of the history table based on the read retry operation includes:
  determining that an error of the second read data is correctable; and
  subsequent to determining that the error of the second read data is correctable, updating the offset information of the history table based on the second distribution information.

16. A method of operating a storage device that includes a non-volatile memory device and a storage controller, the method comprising:
  providing, by the storage controller, a read command to the non-volatile memory device;
  performing, by the non-volatile memory device, an on-chip read operation based on the read command;
  while providing, by the non-volatile memory device, the storage controller with read data, concurrently providing distribution information corresponding to the read data;
  determining, based on the read data and by the storage controller, that an error of the read data is correctable; and
  subsequent to determining that the error of the read data is correctable updating, by the storage controller, offset information of a history table in the storage controller based on the distribution information.

17. The method of claim 16, wherein performing the on-chip read operation based on the read command includes:
  generating, by the non-volatile memory device, the read data and the distribution information based on a target read voltage level of the read command; and
  updating, by the non-volatile memory device, the distribution information in an E-fuse circuit of the non-volatile memory device.

18. A storage controller comprising:
  a command manager configured to provide a read command to a non-volatile memory device;
  a buffer memory configured to, while receiving first read data, concurrently receive first distribution information corresponding to the first read data from the non-volatile memory device;
  an error correcting code (ECC) engine configured to communicate with the buffer memory and to decode the first read data, wherein the command manager is operable to control the ECC engine; and
  a history table configured to manage offset information, wherein the command manager is configured to
    determine whether an error of the first read data is correctable, based on a decoding of the first read data by the ECC engine, and
    perform a subsequent operation subsequent to determining whether the error of the first read data is correctable, wherein performing the subsequent operation includes
      subsequent to determining that the error of the first read data is correctable, updating the offset information of the history table based on the first distribution information of the buffer memory, or
      subsequent to determining that the error of the first read data is not correctable, determining a read retry voltage level based on the first distribution information.

19. The storage controller of claim 18, wherein the command manager is further configured to:
  optimize a target read voltage level based on the offset information of the history table; and
  provide the non-volatile memory device with a next read command indicating the optimized target read voltage level.

20. The storage controller of claim 18, wherein the command manager is configured to:
  provide the non-volatile memory device with a read retry command indicating the read retry voltage level,
  wherein the buffer memory is operable to, while receiving second read data, concurrently receive second distribution information corresponding to the second read data from the non-volatile memory device,
  wherein the ECC engine is further configured to decode the second read data, and
  wherein the command manager is further configured to
    determine that an error of the second read data is correctable, based on a communication with the ECC engine, and
    subsequent to determining that the error of the second read data is correctable, update the offset information of the history table based on the second distribution information of the buffer memory.

* * * * *